(12) United States Patent
Goldstein et al.

(10) Patent No.: US 7,680,097 B1
(45) Date of Patent: *Mar. 16, 2010

(54) NETWORK SWITCH HAVING A HYBRID SWITCH ARCHITECTURE

(75) Inventors: Adam Goldstein, Santa Clara, CA (US); David Smith, Union City, CA (US); Harish Devanagondi, Saratoga, CA (US); Hugh Barrass, Milpitas, CA (US); Kamran Torabi, Sunnyvale, CA (US); Rajesh Patil, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

This patent is subject to a terminal disclaimer.

(21) Appl. No.: 11/365,214

(22) Filed: Feb. 28, 2006

Related U.S. Application Data

(62) Division of application No. 09/560,673, filed on Apr. 27, 2000, now Pat. No. 7,079,525.

(51) Int. Cl.
*H04J 1/16* (2006.01)
(52) U.S. Cl. ...................... 370/351; 370/354
(58) Field of Classification Search ................ 370/351, 370/354, 355, 356; 379/1.01, 27.01, 27.06
See application file for complete search history.

(56) References Cited

U.S. PATENT DOCUMENTS

| | | | |
|---|---|---|---|
| 5,583,861 A | 12/1996 | Holden | |
| 5,856,977 A * | 1/1999 | Yang et al. | 370/395.72 |
| 5,953,314 A | 9/1999 | Ganmukhi et al. | |
| 6,112,251 A * | 8/2000 | Rijhsinghani | 709/249 |
| 6,141,344 A * | 10/2000 | DeLong | 370/360 |
| 6,470,021 B1 * | 10/2002 | Daines et al. | 370/422 |
| 6,621,818 B1 | 9/2003 | Szczepanek et al. | |
| 6,724,758 B1 * | 4/2004 | Wright | 370/388 |
| 6,747,971 B1 * | 6/2004 | Hughes et al. | 370/387 |
| 6,847,645 B1 * | 1/2005 | Potter et al. | 370/392 |
| 7,079,525 B1 | 7/2006 | Goldstein et al. | |

* cited by examiner

*Primary Examiner*—Chi H Pham
*Assistant Examiner*—Fan Ng
(74) *Attorney, Agent, or Firm*—Schwegman, Lundberg & Woessner, P.A.

(57) ABSTRACT

A network switch having a hybrid switch architecture, which is scalable to increase connectivity, buffering, and bandwidth by using multiple shared-memory switch fabrics and multiple crossbar switch fabrics. Each of the crossbar switch fabrics is coupled to each of the shared-memory switch fabrics. The shared-memory switch fabrics are configured to store and retrieve packets. The crossbar switch fabrics are configured to distribute and recollect packets to and from each of the shared-memory switch fabrics. The network switch having a hybrid switch architecture distributes packets from a crossbar switch fabric to the multiple shared-memory switch fabrics to share the distributed packets among the multiple shared-memory switch fabrics.

38 Claims, 11 Drawing Sheets

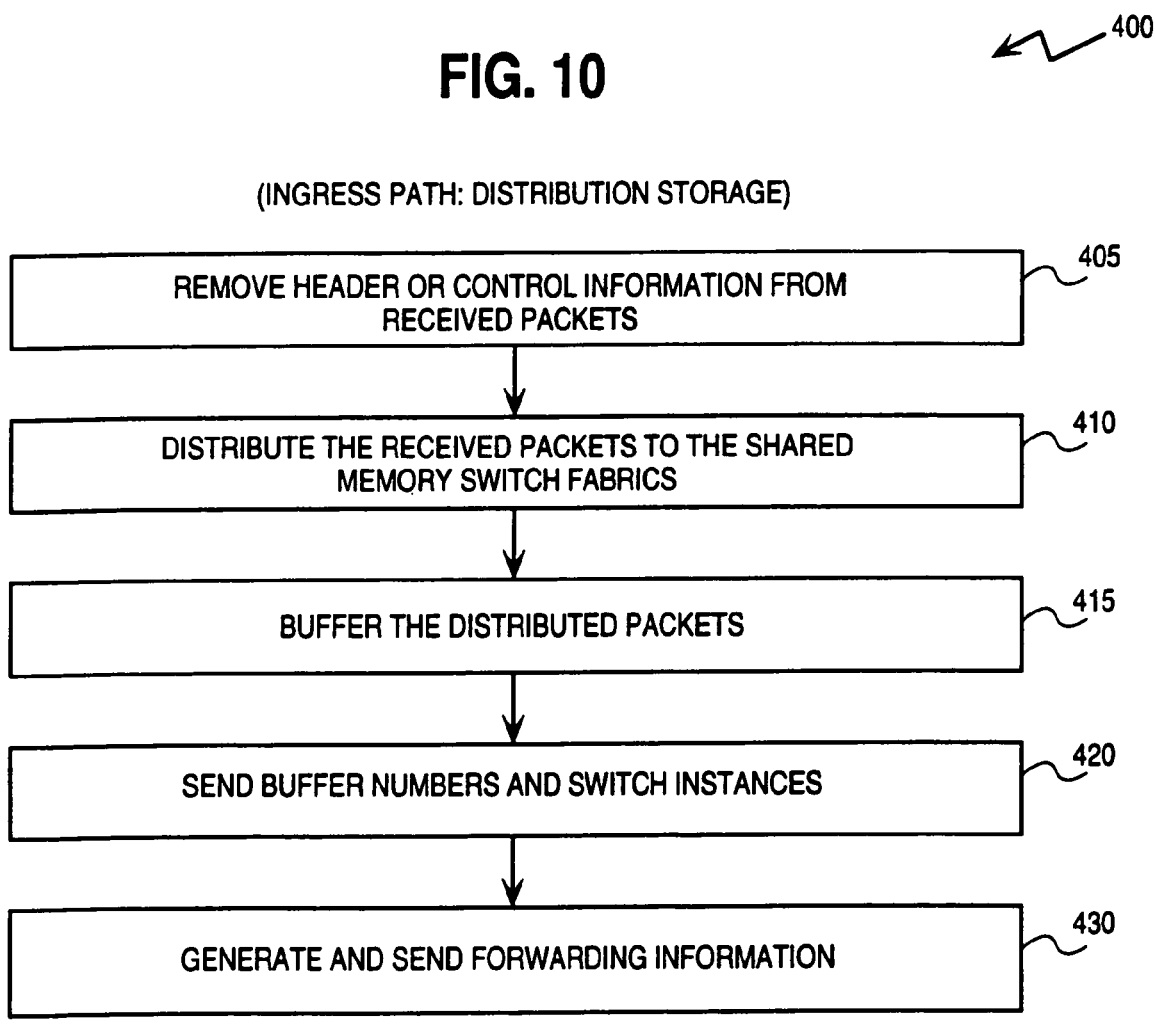

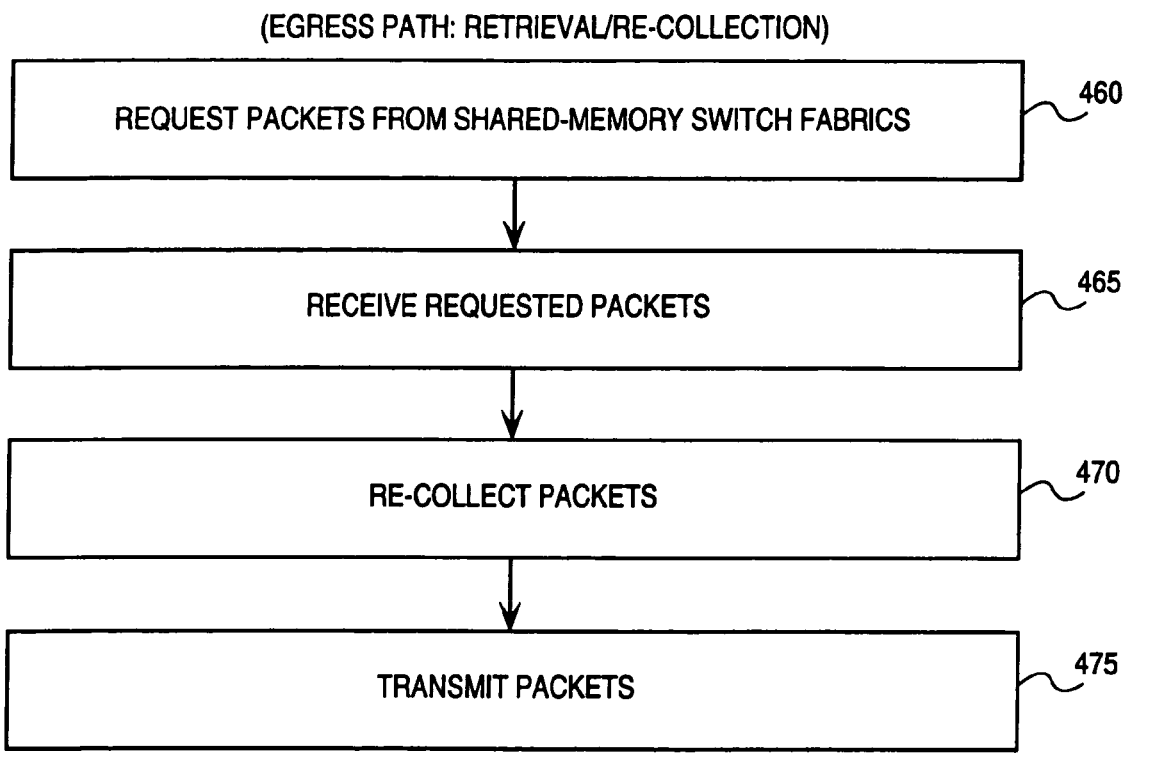

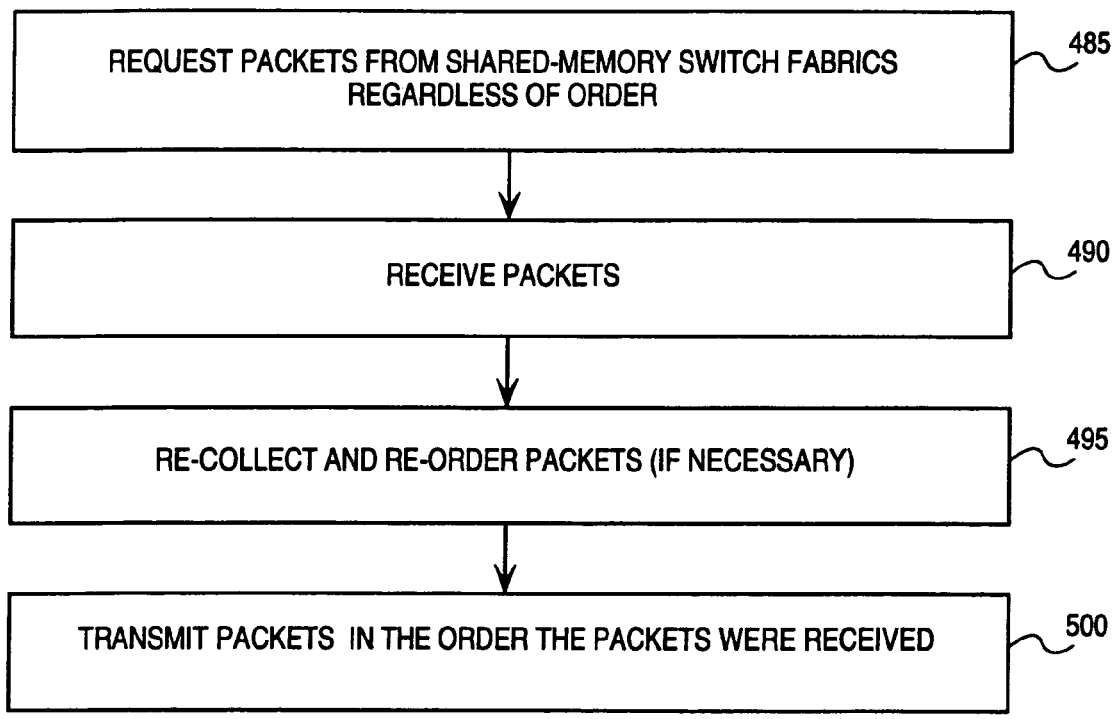

NETWORK SWITCH HAVING A HYBRID SWITCH ARCHITECTURE

CROSS REFERENCE TO RELATED APPLICATION

The present application claims priority from and is a divisional application of U.S. patent application Ser. No. 09/560,673 filed Apr. 27, 2000 now U.S. Pat. No. 7,079,525.

FIELD OF THE INVENTION

The present invention pertains to the field of network switches and data switching. More particularly, the present invention relates to a network switch having a hybrid switch architecture.

BACKGROUND OF THE INVENTION

A network switch is a device that forwards data packets from a source network component or components to a destination network component or components. Typically, a network switch receives data packets from a source network component on a first set or sets of ports ("ingress ports") and forwards data packets to a destination network component or components on a second set or sets of ports ("egress ports").

Today network switches are continuously being developed to improve performance. Performance of a network switch can be characterized by three metrics: connectivity, buffering, and bandwidth. Connectivity relates to the number of ingress ports and egress ports the network switch can interconnect. Buffering relates to the number of packets that can be stored internal to the switch before packets are dropped when egress ports are congested. Bandwidth relates to the aggregate number of bits or packets that can flow through all the ingress and egress ports at a time. Connectivity, buffering, and bandwidth may be referred to collectively as "capacity."

As the demand for capacity increases for network switches, the ability to scale or add capacity using existing switch architectures is desirable. One method for scaling capacity is to design an Application Specific Integrated Circuits (ASIC) chip with more circuits operating at higher speeds. A disadvantage of this method is that a new ASIC chip design is required each time capacity is increased. Another disadvantage to this method is the technological limits on switch capacity imposed by the current state of ASIC technology.

Other limiting factors affecting the ability to scale capacity for a network switch are limitations related to the network switch typically being constructed with a single switch fabric architecture. For example, one type of network switch uses a crossbar switch. A crossbar switch is a switching device that forwards packets directly from ingress ports to egress ports without buffering packets. Typically, a crossbar switch forwards packets at "wire speed" that allows for permutation mapping of packets between ingress ports and egress ports without packets being dropped. Although a crossbar switch may have ideal performance for permutation mapping, a problem associated with the crossbar switch is "output port contention" that occurs when multiple packets are destined to the same output port ("egress port"). Because only one packet may be forwarded to an output port at a time, other packets may be blocked and must be buffered externally to avoid data loss.

One type of switch architecture that avoids such data loss requires that packets are buffered at the input side of the crossbar switch. A disadvantage with buffering packets at the input is that performance may be degraded by a phenomenon known as head of line ("HOL") blocking. HOL blocking occurs when a packet must wait in a buffer for an egress port to be available before being forwarded that causes delay in forwarding other packets. Another type of switch architecture that avoids such data loss requires that packets are buffered at the output side of the crossbar switch. Although HOL blocking may be avoided, a disadvantage with buffering packets at the output side is that the amount of buffering required becomes proportional to the square of the number of ports for the switch.

In addition, the amount of circuitry required to increase capacity using just a crossbar switch is proportional to the square of the number of ports. Therefore, a network switch using a crossbar switch alone is not suitable for scaling capacity.

Another type of network switch includes a shared-memory switch. A shared-memory switch is a switching device that stores packets from ingress ports in a buffer memory before being forwarded to egress ports. A shared memory switch uses a common source of buffer memory for all ports, which results in more efficient use of memory resources than input or output buffering. A fundamental disadvantage of using a shared-memory switch is that performance is limited by the bandwidth of a data bus to the buffer memory. As such, a network switch having a shared-memory switch alone is not suitable for scaling capacity.

SUMMARY OF THE INVENTION

A network switch having a hybrid switch architecture is disclosed. For one embodiment, the network switch having a hybrid switch architecture includes at least two shared-memory switch fabrics and at least two crossbar switch fabrics. Each shared-memory switch fabric is configured to store and retrieve packets. Each crossbar switch fabric is coupled to each shared-memory switch fabric and configured to distribute and re-collect packets.

For another embodiment, the network switch having a hybrid switch architecture includes a first crossbar switch fabric that distributes received packets to at least two shared-memory switch fabrics. The distributed packets are stored in a shared buffer memory for each shared-memory switch fabric. A second crossbar switch fabric is used for reassembling the packets from the shared memory switch fabrics.

Other features and advantages of the present invention will be apparent from the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which:

FIG. 10 is a flow diagram of one embodiment of an operation for distributing and storing packets on an ingress path;

FIG. 11 is a flow diagram of one embodiment of an operation for retrieving and re-collecting packets on an egress path; and FIG. 12 is a flow diagram of an alternative embodiment of an operation for retrieving and re-collecting packets on an egress path using re-ordering.

DETAILED DESCRIPTION

Figure 1:
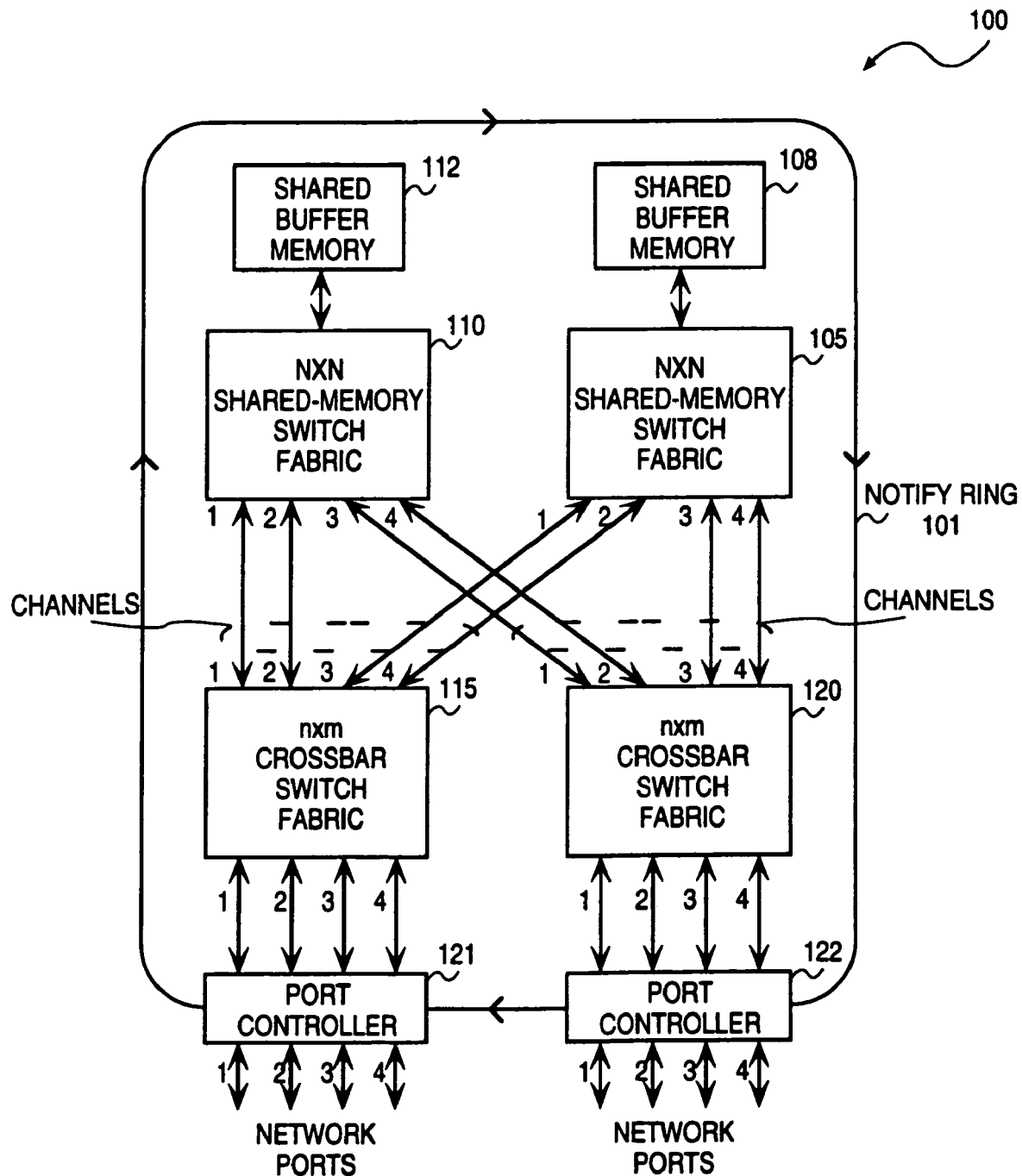
FIG. 1 is a block diagram of a network switch having a hybrid switch architecture according to one embodiment.

A network switch having a hybrid switch architecture is described using shared-memory switch fabrics and crossbar switch fabrics. The number of crossbar switch fabrics for the hybrid switch architecture is typically greater than the number of shared memory switch fabrics and the connectivity of the crossbar switch fabrics is less than the connectivity of the shared-memory switch fabrics. Furthermore, the connectivity (and thus complexity) of the crossbar switch fabrics may be significantly smaller than that of the overall switch.

For one embodiment, a network switch having a hybrid switch architecture includes at least two shared-memory switch fabrics and at least two crossbar switch fabrics. Each shared-memory switch fabric is configured to store and retrieve data packets ("packets"). Each crossbar switch fabric is coupled to each shared-memory switch fabric and configured to distribute and re-collect packets. For another embodiment, the network switch having a hybrid switch architecture includes a first crossbar switch fabric that distributes received packets to at least two shared-memory switch fabrics. The distributed packets are stored in a shared buffer memory for each shared-memory switch fabric. A second crossbar switch fabric is used for re-assembling the packets from the shared memory switch fabrics.

The hybrid switch architecture provides multiple shared-memory switch fabrics and multiple crossbar switch fabrics instead of a single switch fabric for a network switch. The network switch may be scaled to increase capacity (connectivity, bandwidth, and buffering) using the hybrid switch architecture.

For example, crossbar switch fabrics may be added in the hybrid switch architecture to increase connectivity. Connectivity is increased by adding crossbar switch fabrics because more ports are available to receive and transmit packets. Shared-memory switch fabrics may also be added in the hybrid switch architecture to increase buffering. Buffering is increased by adding shared-memory switch fabrics because more buffer memories are available to buffer packets. Furthermore, bandwidth is increased by using the combination of crossbar switch fabrics and shared-memory switch fabrics because more packets may be switched at a time.

In the following embodiments, a network switch includes a port controller having network ports, which may be used as both "ingress ports" and "egress ports." Ingress ports refer to network ports that are used to receive packets from a source network component. Egress ports are network ports that are used to forward packets to a destination network component. An ingress port controller refers to a port controller for receiving packets from a source network component via ingress ports and for forwarding received packets to an ingress crossbar switch fabric. An egress port controller refers to a port controller for receiving packets from an egress crossbar switch fabric and for sending the packets to a destination network component via egress ports.

In the following embodiments, an ingress crossbar switch fabric refers to a crossbar switch fabric that receives packets from a source network component via ingress ports of an ingress port controller and distributes the received packets to the shared-memory switch fabrics that store the packets temporarily in a shared buffer memory. An ingress path refers to the path on which the packets are received and distributed by the ingress crossbar switch fabrics to the shared-memory switch fabrics, and the path on which packets are stored temporarily in the shared buffer memory for each shared-memory switch fabric.

In the following embodiments, an egress crossbar switch fabric refers to a crossbar switch fabric that recollects packets from shared-memory switch fabrics and forwards the packets to a destination network component via egress ports of an egress port controller. An egress path refers to the path on which the packets are retrieved and recollected by the egress crossbar switch fabrics from the shared-memory switch fabrics, and the path on which the packets are forwarded to a destination network component.

In the following embodiments, each crossbar switch fabric may act as either an ingress crossbar switch fabric or an egress crossbar switch fabric depending on whether the crossbar switch fabrics are distributing packets (ingress crossbar switch fabric) or re-collecting packets (egress crossbar switch fabric).

In the following embodiments, "distribution" or "distributing" refers to the process of distributing packets from ingress ports to the shared-memory switch fabrics. The distributing process also refers to storing temporarily the distributed packets in a shared buffer memory corresponding to a shared-memory switch fabric. The distributing process may also refer to buffering packets in an ingress port controller before being forwarded to ingress crossbar switch fabrics for distribution.

In the following embodiments, "re-collection" or "re-collecting" refers to the process of retrieving or collecting packets that have been stored in the shared buffer memories to be forwarded to egress ports. The re-collecting process may also refer to storing temporarily the packets from the egress crossbar switch fabric in buffers ("egress buffers") of a port controller before being forwarded to egress ports. The re-collecting process may also refer to re-ordering the packets that are temporarily stored in egress buffers of the port controller, and forwarding the packets to the egress ports in accordance with the re-ordering. Alternatively, the re-collection process may refer to forwarding directly packets from an egress crossbar switch fabric to egress ports.

In the following embodiments, the network switch having a hybrid switch architecture is presented in the context of switching data packets for a network. Nevertheless, other types of data units for different types of networks may be used. For example, in the following embodiments, a data frame for an Ethernet network, or a data cell for an asynchronous transfer mode ATM network ("ATM cell") may be used in the hybrid switch architecture.

Hybrid Switch Architecture

FIG. 1 is a block diagram of a network switch 100 having a hybrid switch architecture according to one embodiment. The hybrid switch architecture for network switch 100 uses multiple crossbar switch fabrics and multiple shared-memory switch fabrics.

On an ingress path, crossbar switch fabrics receive packets from ingress ports via a port controller and distribute directly received packets to multiple shared-memory switch fabrics without buffering the packets. Crossbar switch fabrics distribute autonomously packets to the shared-memory switch fabrics without reference to the final network port destination of the packets.

On an egress path, crossbar switch fabrics re-collect packets from the shared-memory switch fabrics and forward the packets to egress ports via a port controller. When a crossbar switch fabric is distributing received packets, the crossbar switch fabric is referred to as an "ingress crossbar switch fabric." When a crossbar switch fabric is re-collecting packets from the shared-memory switch fabrics, the crossbar switch fabric is referred to as an "egress crossbar switch fabric."

The shared-memory switch fabrics are switching devices that store and retrieve packets to and from a respective shared buffer memory. Shared-memory switch fabrics store temporarily packets from crossbar switch fabrics in a corresponding shared buffer memory and retrieve packets for egress port controllers requesting specific packets. Shared memory switch fabrics also send a buffer number for each stored packet to ingress port controllers via ingress crossbar switch fabrics. The buffer number indicates where in a shared buffer a distributed packet is stored, and the ingress crossbar switch fabric records which shared-memory switch fabric has stored the switched packet as the switch instance. The ingress port controller uses the buffer number and switch instance to generate and transmit forwarding information to egress port controllers such that egress port controllers are able to request desired distributed packets.

Port controllers are processing units between network ports and crossbar switch fabrics. On an ingress path, port controllers ("ingress port controllers") receive packets from network ports and forward packets to crossbar switch fabrics. Ingress port controllers may buffer temporarily packets before forwarding packets to crossbar switch fabrics for distribution. On an egress path, port controllers ("egress port controllers") recollect distributed packets from the shared-memory switch fabrics via the crossbar switch fabrics and forward the recollected packets to a destination network component via egress ports. Egress port controllers may buffer temporarily re-collected packets before forwarding re-collected packets to a destination network component.

Ingress port controllers are responsible for performing lookup and forwarding functions. Ingress port controllers perform lookup functions by reading information from received packets in determining to which network ports received packets are destined. Ingress port controllers perform forwarding functions by receiving a buffer number from the shared-memory switch fabrics that stored the distributed packets and receiving a switch instance from the crossbar switch fabric that selected a switch instance. The buffer number and switch instance are included in forwarding information for the packets switched. This forwarding information is sent to other port controllers via the notify ring. By using the notify ring to transmit "forwarding information," egress port controllers may re-collect the appropriate packets destined for them.

That is, forwarding information allows port controllers to determine which packets are destined to which egress port controllers. Forwarding information also allows port controllers to determine the shared-memory switch fabric from which to request a packet and in which location of a shared buffer memory the packet is stored. Furthermore, by sending forwarding information on the notify ring, port controllers may maintain ordering of packets for re-collection. For example, egress port controllers may re-collect distributed packets in the order the packets were received on ingress ports. Alternatively, egress port controllers may re-collect distributed packets in any order and reorder the distributed packets before being forwarded to egress ports.

Referring to FIG. 1, the hybrid switch architecture of network switch 100 includes a plurality of nxm crossbar switch fabrics (115, 120) coupled to a plurality of NxN shared-memory switch fabrics (110, 105). Network switch 100 also includes a plurality of port controllers (121, 122), a plurality of buffer memories (112, 108), and a notify ring 101.

The NxN shared-memory switch fabrics (105, 110) operate functionally with N inputs and N outputs on N channels for receiving and sending packets wherein N is an integer greater than 1 and at least one channel is coupled to each of the nxm crossbar switch fabrics (115, 120). For purposes of explanation, N=4 and NxN shared-memory switch fabrics (115, 120) are 4x4 shared-memory switch fabrics having N=4 inputs and outputs on N=4 channels. The N=4 channels are bi-directional for receiving and transmitting packets.

The nxm crossbar switch fabrics (115, 120) operate functionally with n ports and m channels wherein n is an integer and m is an integer greater than 1. For purposes of explanation, n=4 and m=4 and crossbar switch fabrics (115, 120) are 4x4 crossbar switch fabrics having 4 ports and 4 channels. The n=4 ports and the m=4 channels are bi-directional for receiving and transmitting packets.

Crossbar switch fabrics (115, 120) may have other nxm densities. For example, crossbar switch fabrics (115, 120) may be 2x4 crossbar switch fabrics. For one embodiment, m is an integer multiple of the total number of shared-memory switch fabrics. For example, network switch 100 may have 2 shared-memory switch fabrics and network switch 100 may be a 96 port network switch having 12 8x8 crossbar switch fabrics, and each 8x8 crossbar switch fabric includes four channels coupled to a first 48x48 shared-memory switch fabric and four channels coupled to a second 48x48 shared-memory switch fabric.

For one embodiment, the network ports for network switch 100 and the m channels for the crossbar switch fabrics may have different data rates and bandwidths. For example, to address the circumstance where multiple ports would simultaneously request packets from the same channel, the aggregate bandwidth of the m=4 channels for the crossbar switch fabrics to the shared-memory switch fabrics may be greater than the aggregate bandwidth of the network ports for network switch 100. By having the data rate for the m=4 channels greater than the data rate of the network ports, contention time (time a channel is not available) may be hidden from the network ports when packets are buffered in the port controller. That is, a port controller may forward a constant stream of packets that are buffered to egress ports because the rate at which the packets are retrieved is higher than the rate at which packets are being transmitted.

The nxm crossbar switch fabrics 115 and 120 are coupled to network ports via port controllers 121 and 122, respectively. Port controllers 121 and 122 are coupled to n=4 networks ports. On an ingress path, port controllers 121 and 122 request packets from a source network component via n=4 network ports and forward packets to nxm crossbar switch fabrics 115 and 120, respectively. On an egress path, port controllers 121 and 122 request packets from nxm crossbar switch fabrics 115 and 120, respectively, and forward the packets to a destination network component via n=4 network ports.

For one embodiment, an equal number of channels for each crossbar switch fabric is coupled to each shared-memory switch fabric. In the example of FIG. 1, channels 1 and 2 of crossbar switch fabric 115 are coupled to channels 1 and 2 of shared-memory switch fabric 110. Channels 3 and 4 of crossbar switch fabric 115 are coupled to channels 1 and 2 of shared-memory switch fabric 105. Channels 1 and 2 of crossbar switch fabric 120 are coupled to channels 3 and 4 of shared-memory switch fabric 110. Channels 3 and 4 of crossbar switch fabric 120 are coupled to channels 3 and 4 of shared-memory switch fabric 105. Thus, nxm crossbar switch fabrics 115 and 120 distribute and recollect packets from shared-memory switch fabrics 110 and 105 on m=4 channels.

Network switch 100 also includes shared buffer memories 112 and 108 and notify ring 101. Shared buffer memories 112 and 108 are coupled to shared-memory switch fabrics 110 and 105, respectively. Although shared buffer memories 112 and 108 are shown coupled to shared-buffer memory switch fabrics 110 and 105, shared buffer memories 112 and 108 may be included within each NxN shared-memory switch fabrics 110 and 105. Shared buffer memories 112 and 108 are memory devices such as a random access memory (RAM), dynamic random access memory (DRAM), or other suitable memory device. For example, shared buffer memories 112 and 108 may be a 2 Mbyte dynamic random access memory DRAM.

Notify ring 101 couples port controllers 121 and 122 together. Notify ring 101 may also couple other port controllers that may be added to network switch 100. Notify ring is a transmission medium such as a data bus. Port controllers 121 and 122 send forwarding information to each other via notify ring 101. The forwarding information allows port controllers to request packets from the shared-memory switch fabrics. The forwarding information also allows port controllers to maintain ordering of packets being switched in network switch 100 as will be explained in further detail below.

Basic Operation of the Hybrid Switch Architecture

Referring to FIG. 1, the basic operation of the hybrid switch architecture for network switch 100 will be now described. For purposes of explanation, port controller 121 and crossbar switch fabric 115 act as an ingress port controller and an ingress crossbar switch fabric, respectively, and port controller 122 and crossbar switch fabric 120 act as an egress port controller and an egress crossbar switch fabric, respectively. Thus, packets received by ingress port controller 121 and ingress crossbar switch fabric 115 packets are destined for egress crossbar switch fabric 120 and egress port controller 122.

On an ingress path, ingress port controller 121 receives packets on network ports 14 from a source network component and forwards the received packets to ingress crossbar switch fabric 115. Alternatively, if ports to ingress crossbar switch fabric 115 are busy, ingress port controller 121 may buffer temporarily received packets before forwarding received packets to ingress crossbar switch fabric 115. Ingress port controller 121 may remove header or control information from received packets before forwarding the received packets to ingress crossbar switch fabric 115. For one embodiment, ingress port controller 121 may send forwarding information to egress port controller 122 via notify ring 101 informing egress port controller 122 that the received packets are destined for egress port controller 122.

For example, if ingress port controller 121 receives packet "A" that is destined for a network port associated with egress port controller 122, ingress port controller 121 waits for a buffer number and switch instance related to packet "A" from the shared-memory switch fabric that stored packet "A" and the ingress crossbar switch fabric which selected the shared-memory switch fabric. Ingress port controller 121 includes the buffer number and switch instance in the forwarding information, which is sent to egress port controller 122 via notify ring 101. Egress port controller 122 upon receiving the forwarding information from ingress port controller 121 is aware that it is to re-collect packet "A" on an egress path.

Ingress crossbar switch fabric 115 determines which of the shared-memory switch fabrics 110 and 105 to distribute received packets from ingress port controller 121 via channels 14. For one embodiment, ingress crossbar switch fabric 115 distributes selectively received packets from ingress port controller 121 using any number of techniques. For example, ingress crossbar switch fabric 115 may distribute received packets randomly on channels 14 to shared-memory switch fabrics 110 and 105. Alternatively, ingress crossbar switch fabric 115 may distribute selectively received packets using a round robin technique on channels 14 to shared-memory switch fabrics 110 and 105.

On the ingress path, shared-memory switch fabrics 110 and 105 receive the distributed packets from ingress crossbar switch fabric 115 on channels 14 and store the distributed packets in corresponding buffer memories 110 and 105. For one embodiment, shared-memory switch fabrics 110 and 105 generate and sends a buffer number for each packet stored to ingress port controller 121 via ingress crossbar switch fabric 115.

For example, if packet "A" is stored in location "00" of shared buffer memory 112 corresponding to shared-memory switch fabric 110, shared-memory switch fabric 110 sends ingress port controller 121 a buffer number informing ingress port controller 121 that packet "A" is stored in location "00" of shared buffer number 112 corresponding to shared-memory switch fabric 110. Thus, ingress port controller 121 generates and sends forwarding information to the egress port controller 122 via the notify ring 101 that packet "A" is stored in location "00" of shared buffer memory 112 corresponding to shared-memory switch fabric 110. Egress port controller 122 upon receiving the forwarding information may request from shared-memory switch 110 to send packet "A" stored in location "00" of the shared buffer memory 112.

On an egress path, egress port controller 122 sends requests based on received forwarding information for re-collecting packets from shared-memory switch fabrics 110 and 105 that stored distributed packets destined for egress port controller 122. The requests are sent to shared-memory switch fabrics 110 and 105 via egress crossbar switch fabric 120. The requests include buffer numbers and switch instances for requested packets. Upon receiving the requests, shared-memory switch fabrics 110 and 105 retrieve requested packets in corresponding shared buffer memories 112 and 108. Shared-memory switch fabrics 110 and 105 then transmit the retrieved packets to egress crossbar switch fabric 120 via channels 14. Egress crossbar switch fabric 120 receives the requested packets and forwards directly the requested packets to egress port controller 122 via ports 14.

Egress port controller 122 recollects requested packets from egress crossbar switch fabric 120 and forwards the re-collected packets to a destination network component via n=4 egress network ports. Alternatively, egress port controller 122 may buffer temporarily re-collected packets before forwarding the re-collected packets to a destination network component to hide contention time. That is, a constant stream of packets may be forwarded to egress ports from packets buffered in the egress port controller. Furthermore, egress port controller 122 may re-order buffered packets such that the packets are forwarded to a destination network component in the same order the packets were received by the ingress port.

Figure 2:
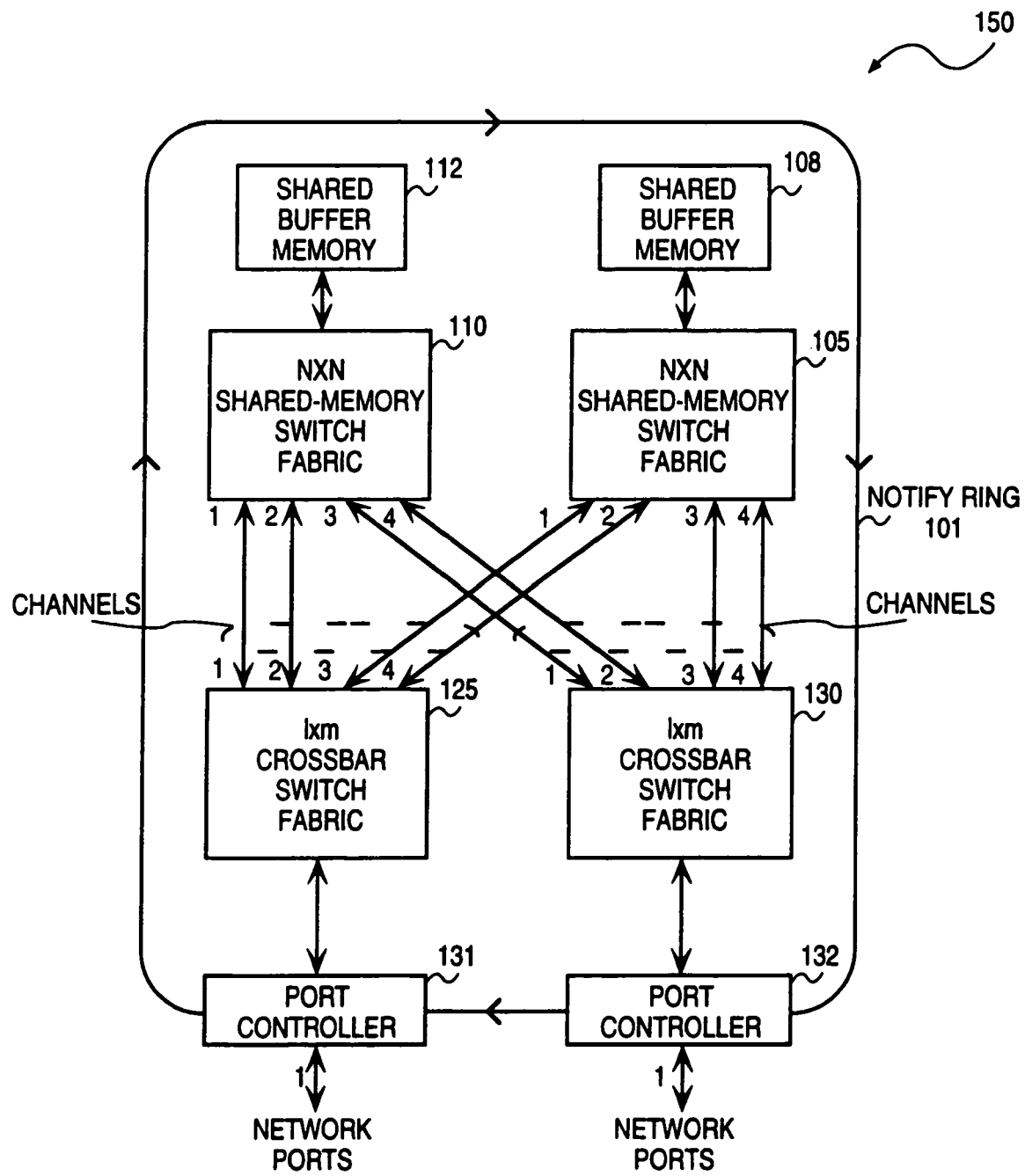
FIG. 2 is a block diagram of a network switch having a hybrid switch architecture according to another embodiment.

FIG. 2 is a block diagram of a network switch 150 having a hybrid switch architecture according to another embodiment.

Referring to FIG. 2, network switch 100 includes a plurality of 1xm crossbar switch fabrics (125, 130) coupled to a plurality of NxN shared-memory switch fabrics (110, 105). Network switch 150 also includes shared buffer memories (112, 108) coupled to NxN shared-memory switch fabrics (110, 105), respectively. Network switch 150 also includes a plurality of port controllers (131, 132) coupling a single network port for each port controller and crossbar switch fabric on ingress paths and egress paths.

For purposes of explanation, NxN shared-memory switch fabrics (110, 105), shared buffer memories (112, 108), and notify ring 101 are constructed and operate in a similar manner as in network switch 100 of FIG. 1. In addition, for purposes of explanation, network switch 150 operates in a similar manner as in network switch 100, but uses a single network port for each port controller and crossbar switch fabric on ingress paths and egress paths.

In the example of FIG. 2, 1xm crossbar switch fabrics (125, 130) operate functionally with 1 port and m channels wherein m is an integer greater than one. For example, m may be an integer multiple of the total number of shared-memory switch fabrics for network switch 150. For example, network switch 150 may have 2 shared-memory switch fabrics and network switch 150 may be a 12 port switch having 12 1x8 crossbar switch fabrics having each having 4 channels coupled to a first 48x48 shared-memory switch fabric and 4 channels coupled to a second 48x48 shared-memory switch fabric.

For purposes of explanation, m=4 and 1xm crossbar switch fabrics (125, 130) are 1x4 crossbar switch fabrics. The 1 port and m=4 channels are bi-directional for receiving and transmitting packets from and to 1 network port via the port controllers. For example, the 1 port may be coupled to a 1 Gigabit/s network port via a port controller, which can be coupled to any of the m=4 (megabit/s) channels to receive and forward packets. For one embodiment, the data rate for the 1 port of the 1xm crossbar switch fabrics (125, 130) and the 1 network port are lower than the data rates for the m=4 channels for the 1xm crossbar switch fabrics (125 and 130). On an ingress path and egress path, 1xn crossbar switch fabrics 125 and 130 operate in a similar manner as nxm crossbar switch fabrics 115 and 120, but utilize a single ingress port and a single egress port instead of multiple ingress and egress ports.

Port Controllers

Figure 3:
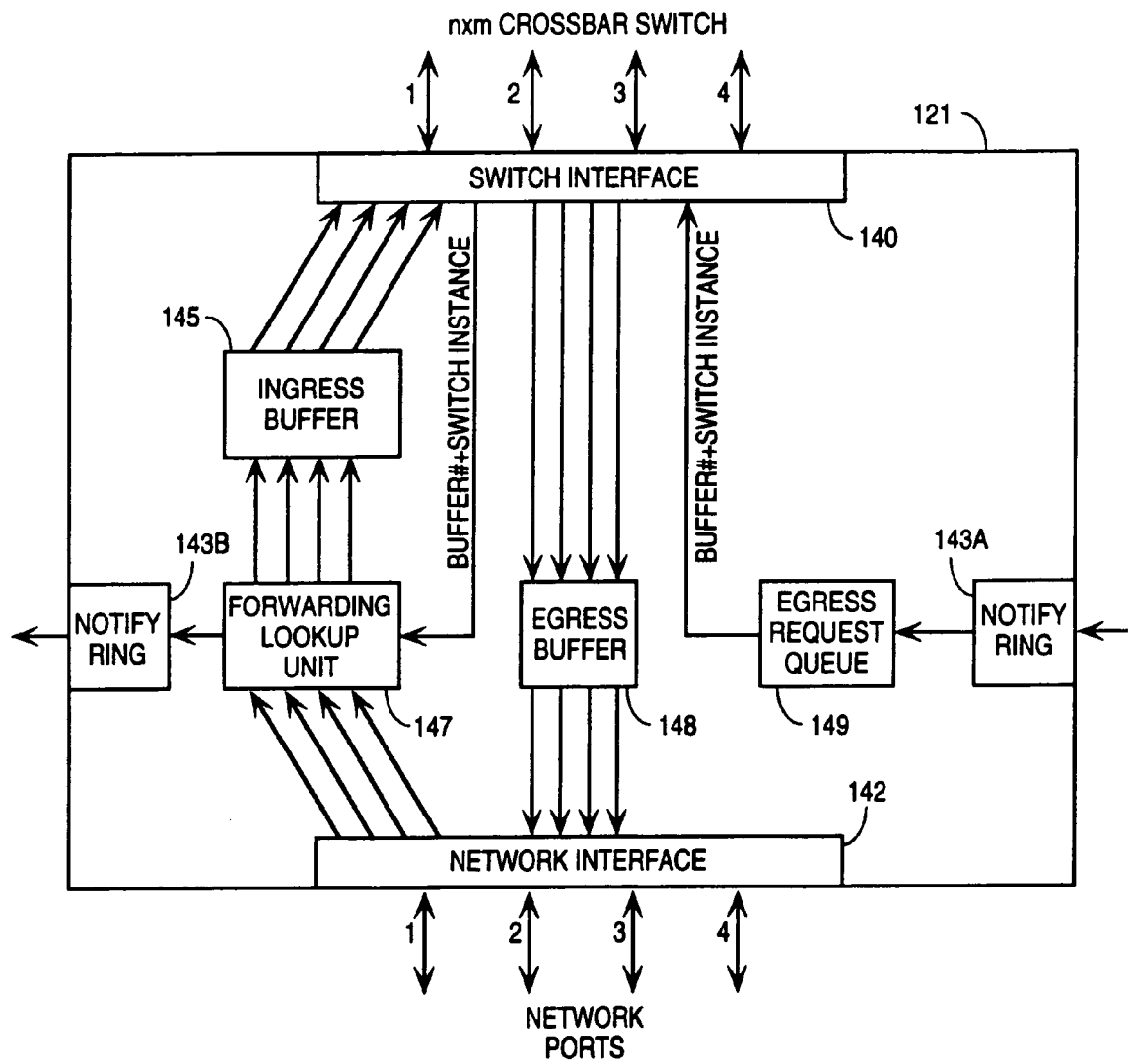
FIG. 3 is a block diagram of one embodiment of a port controller for the hybrid switch architecture of FIG. 1.

FIG. 3 is a block diagram of one embodiment of port controller 121 of FIG. 1. For purposes of explanation, port controller 121 is constructed and operates in the same manner as port controller 120. Thus, the following discussion is related to port controller 121 of FIG. 1.

Referring to FIG. 3, port controller includes network interface 142, forwarding/lookup unit 147, ingress buffer 145, switch interface 140, egress buffer 148, egress request queue 149, and notify ring interfaces 143A and 143B. Although control or logic circuitry is not shown for elements of port controller 121, each of the elements for port controller 121 may include control or logic circuitry to perform the functions as described below.

Network interface 142 is a connection between network ports 1-4 and forwarding/lookup unit 147 and egress buffer 148. On an ingress path, network interface 142 receives packets from a source network component via network ports 1-4 and forwards received packets to forwarding/lookup unit 147. On an egress path, network interface 142 receives packets from egress buffer 148 and forwards received packets from egress buffer 148 to a destination network component via network ports 1-4.

Forwarding/lookup unit 147 is a processing unit that couples and decouples connections between the network interface 142 and switch interface 140. Forwarding/lookup unit 147 may be a microprocessor or other logic circuit. Forwarding/lookup unit 147 is responsible for performing forwarding and lookup functions. Forwarding/lookup unit 147 performs a lookup function by reading header, control or other information from received packets in determining to which egress network ports and egress port controllers packets are destined. Alternatively, the forwarding/lookup unit 147 may remove the header or control information from the packets before forwarding the packets to switch interface 140 during the lookup process.

Forwarding/lookup unit 147 performs a forwarding function by generating forwarding information and sending the forwarding information to other port controllers on notify ring 101 via notify ring interface 143B. For one embodiment, forwarding/lookup unit 147 appends to the forwarding information using the information obtained during the lookup process indicating where packets are destined. The forwarding/lookup unit 147 appends to the forwarding information the buffer number (location a packet is stored in shared buffer memory) and switch instance (shared-memory switch fabric that stored the packet) received from a shared-memory switch fabric via switch interface 140 after a packet is distributed. Forwarding/lookup unit 147 is also responsible for forwarding packets from network interface 142 to ingress buffer 145 on an ingress path.

Ingress buffer 145 is a memory device for storing temporarily packets from forwarding/lookup unit 147. On an ingress path, packets may be buffered in ingress buffer 145 before being forwarded to crossbar switch fabric 115 via switch interface 140. Ingress buffer 145 may be a random access memory (RAM), first-in-first-out memory (FIFO), dynamic random access memory (DRAM), or other suitable memory devices. Ingress buffer 145 allows port controller 121 to buffer packets such that port controller 121 can send packets to ingress crossbar switch fabric 115 at a data rate ingress crossbar switch fabric 115 can handle. In an alternative embodiment, forwarding/lookup unit 147 may forward directly packets to switch interface 140 from network interface 142 and buffering packets in ingress buffer 145 may be omitted.

Switch interface 140 is a connection between port controller 121 and crossbar switch fabric 115. Switch interface is responsible for coupling ingress buffer 145 to n=4 ports of crossbar switch fabric 115. Switch interface is also responsible for coupling n=4 ports of crossbar switch fabric 115 to egress buffer 148. Switch interface 140 is also responsible for receiving requests (including a buffer number and switch instance) from egress request queue 149 and sending requests to shared-memory switch fabrics 110 and 105 via crossbar switch fabric 115. Switch interface 140 is also responsible for receiving a buffer number from a shared-memory switch fabric related to a stored packet via crossbar switch fabric 115 and forwarding the buffer number to forwarding/lookup unit 147.

Notify ring interface 143A is a connection between port controller 121 and notify ring 101. Port controller receives 121 receives forwarding information from other port controllers (i.e., port controller 122) via notify ring interface 143A. Alternatively, notify ring interface 143A and 143B may be a single interface in which forwarding information is received and forwarded for port controller 121. Port controller 121 creates requests and stores the requests in egress request queue 149 based on received forwarding information. Egress request queue 149 stores requests and sends requests to shared-memory switch fabrics 110 and 105 requesting packets that are destined for port controller 121 during recollection of distributed packets. Egress request queue 149 may be a same type of memory device as ingress buffer 145. Egress request queue is responsible for sending the requests to a shared-memory switch fabric via switch interface 140 and crossbar switch fabric 115.

For example, if port controller 121 receives forwarding information that a packet is destined for port controller 121, port controller 121 will generate a request that is queued in egress request queue 149. Egress request queue 149 allows requests to be queued and then sent to shared-memory switch fabrics 110 and 105 on available channels coupled to the shared-memory switch fabrics. Thus, requests in egress request queue 149 may be serviced in any order based on an availability of a channel to a shared-memory switch fabric.

Egress buffer 148 is a memory device for storing temporarily recollected packets from crossbar switch fabric 115, which are to be forwarded to a destination network component via network interface 142. Egress buffer 148 may be a memory device such as a random access memory (RAM), first-in-first-out memory (FIFO), dynamic random access memory (DRAM), or other suitable memory devices.

Egress buffer 148 allows re-collected packets to be buffered and thus received by port controller 121 via channels at a very high data rate and outputted on networks ports at a slower data rate. Furthermore, egress buffer 148 allows contention time (time a channel is required by more than 1 port) to be hidden from port controller 121 because packets may be recollected on any available channel, which allows a constant stream of packets to be forwarded to a destination network component.

Figure 4:
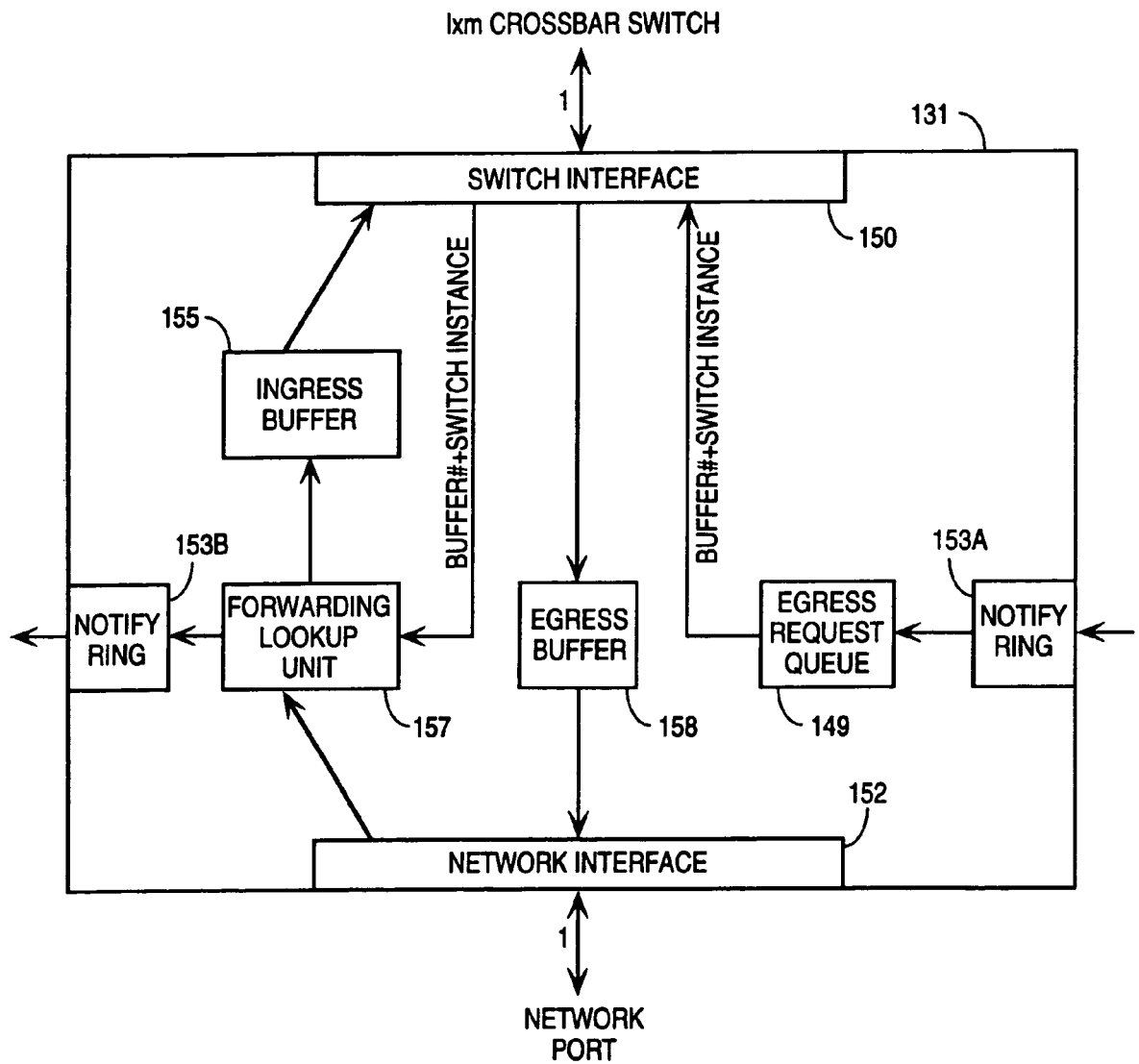
FIG. 4 is a block diagram of one embodiment of a port controller for the hybrid switch architecture of FIG. 2.

FIG. 4 is a block diagram of one embodiment of a port controller 131 for the hybrid switch architecture of FIG. 2. For purposes of explanation, port controller 131 is constructed and operates in the same manner as port controller 132. Thus, the following discussion is related to port controller 131.

Referring to FIG. 4, port controller 131 includes network interface 152, forwarding/lookup unit 157, notify ring interfaces 153A and 153B, ingress buffer 155, switch interface 150, egress request queue 149, and egress buffer 158.

Port controller 131 includes the same elements as port controller 121 of FIG. 2, but is configured for one network port and for a 1xm crossbar switch fabric 125. Thus, port controller 121 operates in the same manner as port controller 121 using a single network port instead of multiple network ports.

Crossbar Switch Fabrics

Figure 5:
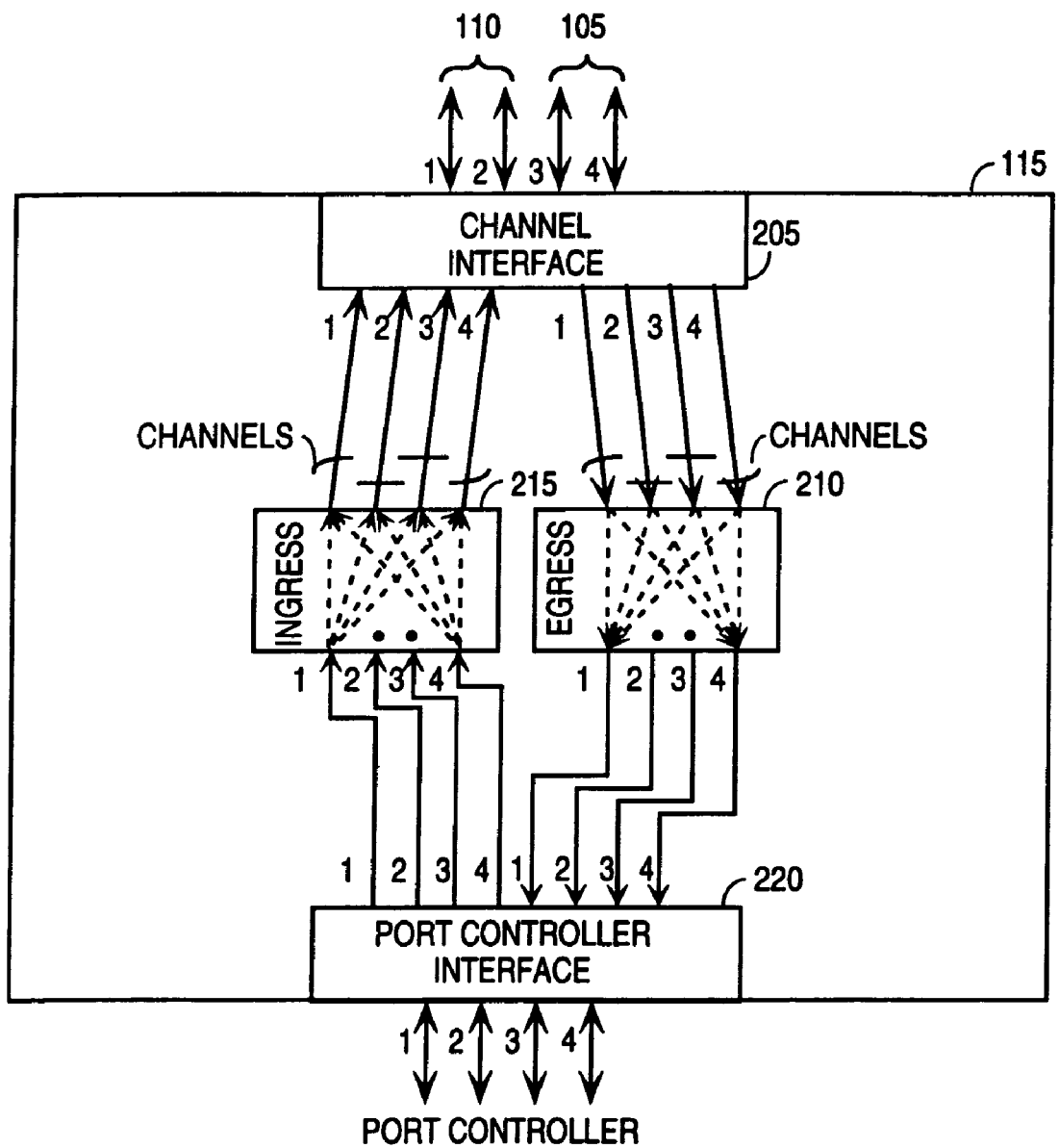
FIG. 5 is a block diagram of one embodiment of a crossbar switch fabric for the hybrid switch architecture of FIG. 1.

FIG. 5 is a block diagram of one embodiment of nxm crossbar switch fabric 115. For purposes of explanation, nxm crossbar switch fabric 115 is constructed and operates in the same manner as nxm crossbar switch fabric 120. As such, the following discussion involves nxm crossbar switch fabric 115.

Referring to FIG. 5, nxm crossbar switch fabric 115 includes port controller interface 220, ingress switching unit 215, egress switching unit 121, and channel interface 205.

Port controller interface 220 is a connection between n=4 ports of crossbar switch fabric 115 and port controller 121. Port controller interface 220 is responsible for receiving packets on n=4 ports and to forward received packets from port controller 121 to inputs of ingress switching unit 215. Port controller interface 220 is also responsible for receiving packets from n=4 outputs of egress switching unit 210 and to forward packets to port controller 121.

Ingress switching unit 215 is a switching device that distributes packets to m=4 channels on an ingress path. Ingress switching unit 215 distributes packets to shared memory switch fabric 110 on channels 1 and 2. Ingress switching unit 215 also distributes packets to shared memory switching fabric 105 on channels 3 and 4. Ingress switching unit 215 may couple any of its inputs to any of its outputs coupled to m=4 channels via channel interface 205. For example, ingress switching unit may receive a packet on input 1 and forward the packet on any one of its 4 outputs. For one embodiment, ingress switching unit 215 distributes packets received on inputs 1-4 to channels 1-4, respectively. Alternatively, ingress switching unit 215 may distribute selectively packets on channels 1-4. For example, ingress switching unit 215 may randomly distribute or use a round robin technique to distribute packets on channels 14. Hence, ingress switching unit 215 may include a random number generator (not shown) used for the random distribution of packets.

Channel interface 205 is a connection between outputs 14 of ingress switching unit 215 and channels 14 coupled to NxN shared-memory switch fabrics 110 and 105. Channel interface 205 is also a connection between channels 14 and inputs 14 of egress switching unit 210. On an ingress path channel interface 205 is configured to receive packets on outputs 14 of ingress switching unit 215 and to transmit the received packets on corresponding channels 14 to NxN shared-memory switch fabrics 110 and 105.

On an egress path channel interface 205 receives packets from NxN shared-memory switch fabrics 110 and 105 on channels 14 and to transmit the packets from NxN shared-memory switch fabrics 110 and 105 to inputs 14 of egress switching unit 210. Channel interface 205 also receives a "packet buffer number" from NxN shared-memory switch fabrics 110 and 105 and transmits the packet buffer number to port controller 121. The "packet buffer number" is used to inform port controller 121 where in a shared buffer memory a packet has been stored. Egress switching unit 210 also transmits the "switch instance" denoting which NxN shared memory switch fabrics 110 and 105 was used to store the packet. The switch instance is used to inform port controller 121 from which shared-memory switch fabric to request a packet. That is, the shared memory switch fabric that stored the packet.

Egress switching unit 210 is a switching device that may transmit packets from a single input to any of its outputs. Egress crossbar switch 210 is configured to couple its inputs 14 to each of its outputs 14. For example, egress switching unit 210 may transmit a packet received on input 1 from channel interface 205 to any of its 4 outputs. Egress switching unit 210 is responsible for transmitting packets from channel interface 205 to egress buffer 148 of port controller 121.

Figure 6:
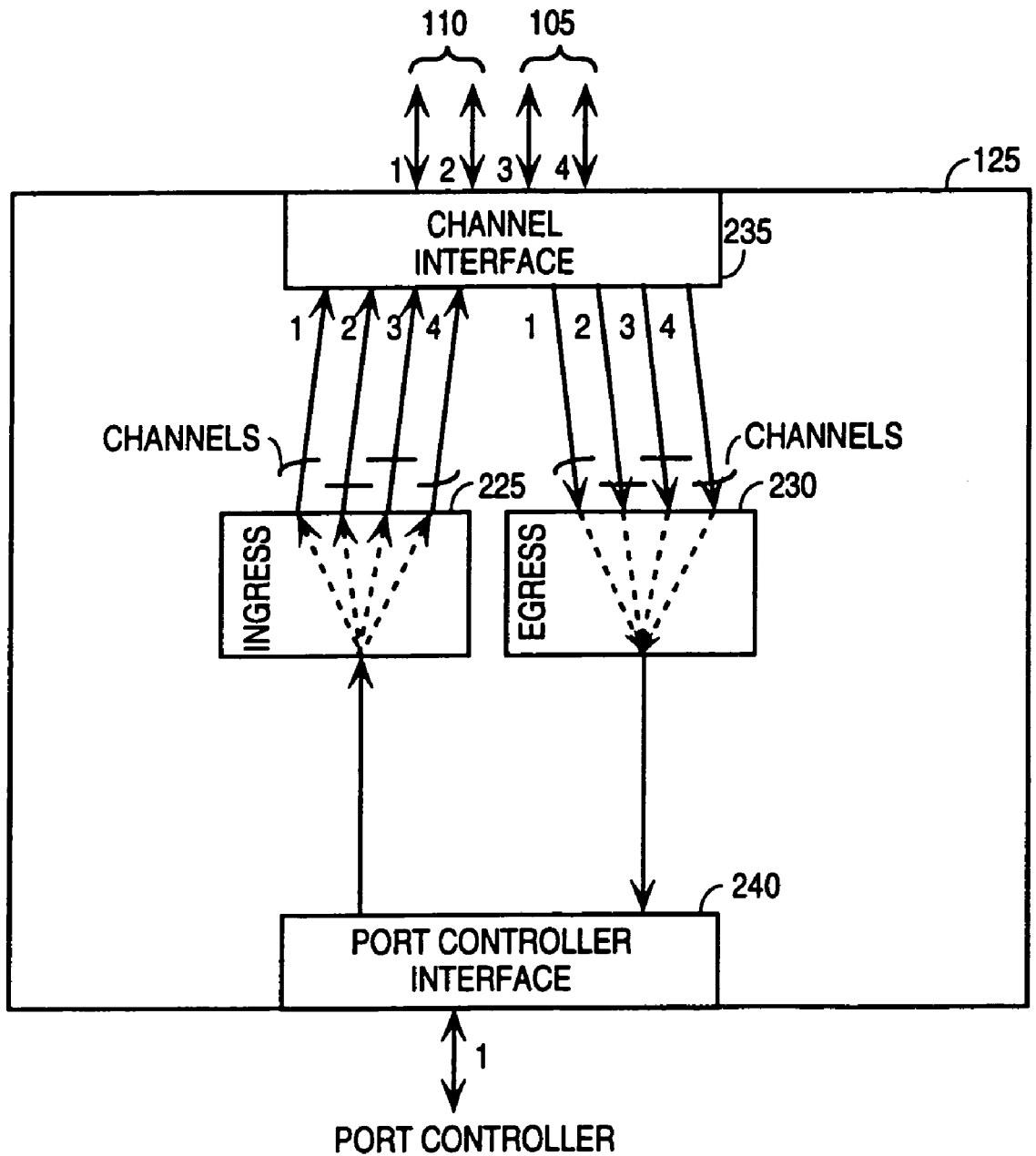
FIG. 6 is a block diagram of one embodiment of a crossbar switch fabric for the hybrid switch architecture of FIG. 2.

FIG. 6 is a block diagram of one embodiment of a crossbar switch fabric 125 for the hybrid switch architecture of FIG. 2. For purposes of explanation, nxm crossbar switch fabric 125 is constructed and operates in the same manner as nxm crossbar switch fabric 130. As such, the following discussion involves nxm crossbar switch fabric 125.

Referring to FIG. 6, nxm crossbar switch fabric 125 includes port controller interface 240, ingress switching unit 225, egress switching unit 230, and channel interface 235. Crossbar switch fabric 125 includes the same elements as crossbar switch fabric 115 of FIG. 5.

Ingress switching unit 225 and egress switching unit 230, however, have a single input being coupled to multiple outputs and multiple inputs being coupled to a single output, respectively. Thus, port controller interface 240 is coupled to a single port. The single port couples the single input of ingress switching unit 225 and is coupled to the single output of egress switching unit 230, which are used for distributing and recollecting packets.

Shared-Memory Switch Fabrics

Figure 7:
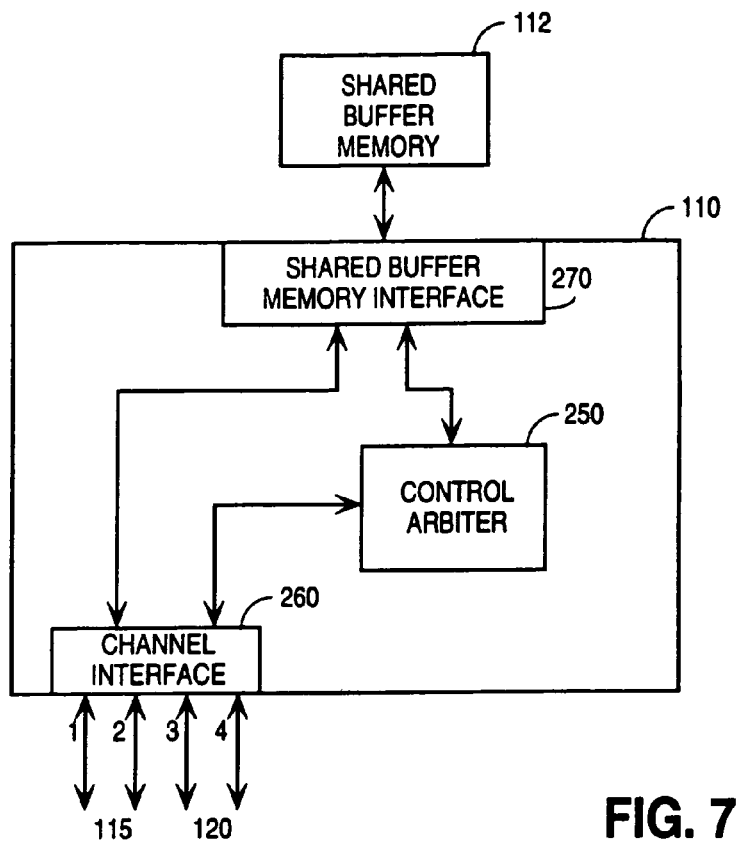
FIG. 7 is a block diagram of one embodiment of a shared-memory switch fabric for the hybrid switch architecture.

FIG. 7 is one embodiment of NxN shared-memory switch fabric 110. For purposes of explanation, NxN shared-memory switch fabric 110 is constructed and operates in a similar manner as NxN shared-memory switch fabric 105. Furthermore, NxN shared-memory switch fabric 110 may be used for the hybrid switch architecture for FIGS. 1 and 2. As such, the following discussion involves NxN shared-memory switch fabric 110.

NxN shared-memory switch fabric 110 includes a control arbiter 250, shared buffer memory interface 270, and a channel interface 260. Control arbiter 250 is coupled to shared buffer memory interface 270 and channel interface 260. Shared buffer memory interface 270 is coupled to shared buffer memory 112 and channel interface 260. Channel interface 260 is also coupled to channels 14 that are coupled to nxm crossbar switch fabrics 115 and 120.

Channel interface 260 is a connection between channels 14 and control arbiter 250 and shared buffer memory interface 270. Shared buffer memory interface 270 is a connection between shared buffer memory 112 and channel interface 260 and control arbiter 250. Control arbiter 250 is the central processing unit of NxN shared-memory switch fabric 110. Control arbiter 250 may also be a microprocessor or other logic circuitry.

Control arbiter 250 controls channel interface 260 to determine which packets on which channels are to be forwarded to the shared buffer memory interface 270. Control arbiter 250 also sends packets from shared buffer memory interface 270 to channel interface 260 and determines which channel packets are to be sent to nxm crossbar switch fabrics 115 and 120 via channel interfaces 14. Control arbiter 250 also controls shared buffer memory interface 270 to retrieve packets from shared buffer memory 112 and to forward retrieved packets to channel interface 260.

Forwarding Information

Figure 9:
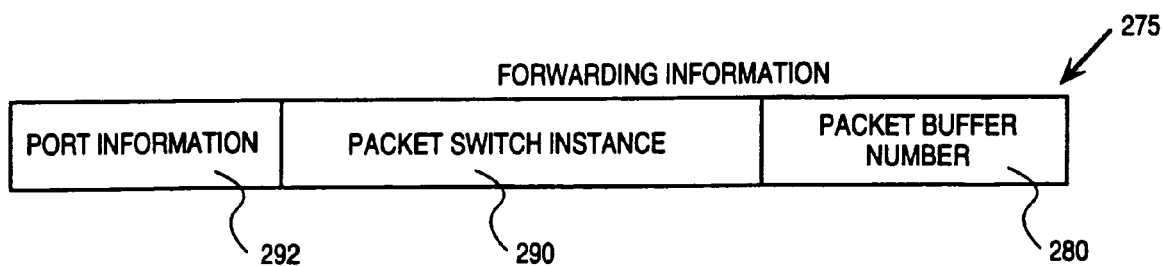
FIG. 9 is a block diagram of one embodiment of forwarding information.

FIG. 9 is a block diagram of one embodiment of forwarding information 275. Forwarding information 275 includes port information 292, packet buffer number 280, and packet switch instance 290. Port information 292 includes information indicating which egress ports and egress port controllers to which a packet is destined. Packet buffer number 280 includes information indicating where in a shared buffer memory a packet is stored. Packet switch instance 290 includes information indicating from which NxN shared-memory switch fabric to request the packet for recollection by an egress crossbar switch fabric.

For example, nxm crossbar switch fabric 115 may distribute packet A to NxN shared-memory switch fabric 110 that is destined for nxm crossbar switch fabric 120 (the egress crossbar switch fabric). NxN shared-memory switch fabric 110 may store packet "A" in shared buffer memory 112 at location 1. NxN shared-memory switch fabric 110 then sends a packet buffer number to port controller 121 via nxm crossbar switch fabric 115 indicating that packet A is stored in shared buffer memory 112 at location 1. Port controller 121 then uses the packet buffer number to generate packet buffer number 280 and packet switch instance 290 indicating that packet A was distributed to NxN shared-memory switch fabric 110 such that an egress port controller should request packet A from NxN shared-memory switch fabric 110. Port controller 121 may also use header or control information from packet 14 to generate port information 292.

The forwarding information 275 is then transmitted on notify ring 101 to port controller 122 such that port controller 122 knows which packet to request from which shared-memory switch fabric and where in a shared buffer memory the packet is stored. Egress port controller 122 may request packet A in the case where the packet is destined for multiple egress ports. Furthermore, all port controllers coupled to notify ring 101 may be informed where packet A is located and from which NxN shared-memory switch fabric to request packet A in the case where the packet is destined for multiple egress ports.

Ingress Path and Egress Path

Figure 8:
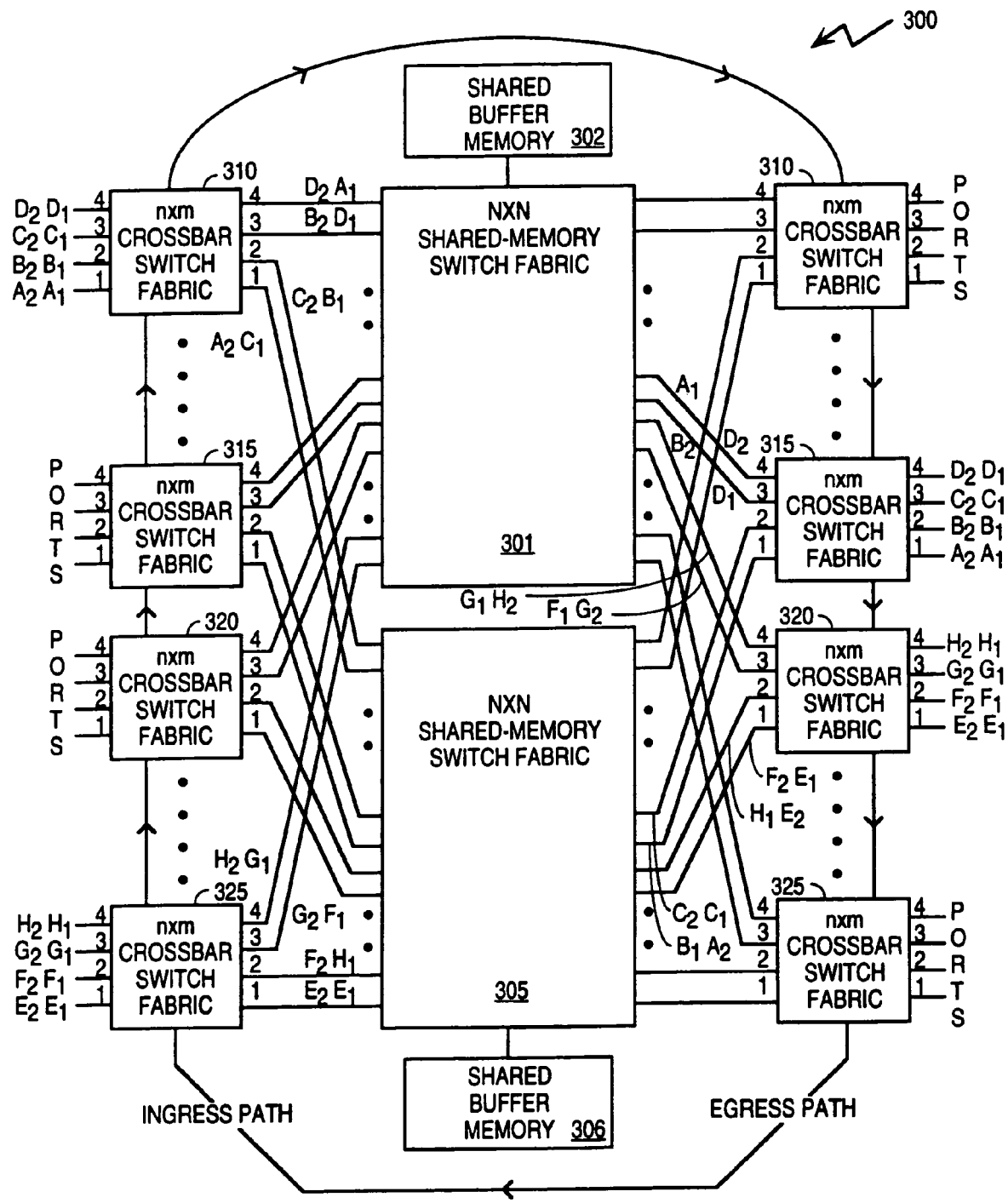
FIG. 8 is a block diagram of one embodiment of a network switch having a hybrid switch architecture to illustrate an ingress path and an egress path.

FIG. 8 is a block diagram of one embodiment of a network switch 300 having a hybrid switch architecture to illustrate an ingress path and an egress path. Network switch 300 includes two NxN shared-memory switch fabrics 301 and 305 and a plurality of nxm crossbar switch fabrics 310, 315, 320, and 325. Network switch 300 also includes shared buffer memory 302 coupled to NxN shared-memory switch fabric 301 and shared buffer memory 306 coupled to NxN shared-memory switch fabric 305. Network switch 300 also includes a notify ring 301 coupled to nxm crossbar switch fabrics 310, 315, 320, and 325.

For purposes of explanation, NxN shared-memory switch fabrics 301 and 305 operate in the same manner as NxN shared-memory switch fabrics 110 and 105 in network switch 100 and 150. Furthermore, for purposes of clarity, ingress and egress port controllers are omitted from network switch 300.

To illustrate the ingress path and the egress path, each nxm crossbar switch fabrics 310, 315, 320, and 325 may be an ingress crossbar switch or an egress crossbar switch depending on whether the nxm crossbar switch fabric is distributing or re-collecting packets. On an ingress path, nxm crossbar switch fabrics 310 and 325 are ingress crossbar switch fabrics receiving packets to be switched to nxm crossbar switch fabrics 315 and 320, which are egress crossbar switch fabrics for re-collecting packets.

For example, nxm crossbar switch fabric 310 receives four sets of packets in the order (A1, A2), (B1, B2), (C1, C2), and (D1, D2) on ports 1 through 4, respectively, which are destined for nxm crossbar switch fabric 315 on the egress path. In the example of FIG. 8, on the ingress path, the four sets of packets are distributed randomly to NxN shared-memory switch fabrics 301 and 305 and then stored in shared buffer memories 302 and 306. In alternative embodiments, the four sets of packets may be distributed in a round robin manner or in the same order the packets were received on ingress ports. For one embodiment, on the egress path, the four sets of packets are re-collected by nxm crossbar switch 315 and then forwarded on ports 1-4 to be transmitted to a destination network component in the same order the four sets of packets were received on the ingress path.

In addition, nxm crossbar switch fabric 325 receives four sets of packets in the order (E1, E2), (F1, F2), (G1, G2), and (H1, H2) on ports 1-4, respectively, which are destined for nxm crossbar switch fabric 320 on the egress path. On the ingress path the four sets of packets are distributed randomly to NxN shared-memory switch fabrics 301 and 305 and then stored in shared buffer memories 302 and 306. On the egress path, the four sets of packets are re-collected by nxm crossbar switch 320 and then forwarded on ports 1 through 4 to be transmitted to a destination network component in the same order the four sets of packets were received on the ingress path.

Ingress Path

Distribution/Storage

FIG. 10 is a flow diagram representing an operation 400 for distributing and storing packets on an ingress path. For purposes of explanation, operation 400 refers to network switch 300 as shown in FIG. 8. The nxm crossbar switch fabrics 310 and 325 are ingress crossbar switch fabrics that are responsible for switching received packets to nxm crossbar switch fabrics 315 and 320, respectively, which are referred to as egress crossbar switch fabrics. The egress crossbar switch fabrics 315 and 320 are responsible for transmitting the packets to a destination network component in the order the packets were received by the ingress crossbar switch fabrics 310 and 325, respectively.

At operation 405, ingress port controllers (not shown) remove header or control information from received packets on ports 1-4. The header or control information are removed such that NxN shared-memory switch fabrics 301 and 305 are not bottlenecked with header or control information to improve performance.

At operation 410, received packets are forwarded to ingress crossbar switch fabrics 310 and 325 for distribution. For one embodiment, ingress crossbar switch fabrics 310 and 325 distribute randomly their respective received four sets of packets on respective channels 1-4. Random distribution of packets reduces the occurrence of long strings of packets stored in one shared-memory switch fabric. Thus, random distribution of packets from the crossbar switch fabric to the shared-memory switch fabrics allows for homogenous "load sharing" among the multiple shared-memory switch fabrics.

Furthermore, by distributing randomly the packets among the different shared-memory switch fabrics, the availability a channel for re-collecting the packets without contention is improved because packets can be recollected homogeneously from all the shared-memory switch fabrics. Thus, the network switch having a hybrid switch architecture may obtain repeatable performance results that are independent of the type of packet traffic being switched.

For another embodiment, ingress crossbar switch fabrics 310 and 325 may distribute their respective received four sets of packets on respective channels 1-4 using a round robin distribution. Round robin distribution distributes packets from an input port to an output port and then to the next output and so and repeats the process after the last output port. By using round robin distribution, optimal load sharing of packets among the multiple shared-memory switch fabrics may be achieved for simple packet patterns.

Referring to FIG. 8, random distribution is illustrated. For example, ingress crossbar switch fabric 310 distributes packets in the following order (C1, A2) and (B1, C2) on channels 1 and 2, respectively, to NxN shared-memory switch fabric 305. Ingress crossbar switch fabric 310 also distributes packets in the following order (D1, B2) and (A1, D2) on channels 3 and 4, respectively, to NxN shared-memory switch fabric 301.

In addition, ingress crossbar switch fabric 325 distributes packets in the following order (E1, E2) and (H1, F2) on channels 1 and 2, respectively, to NxN shared-memory switch fabric 305. Ingress crossbar switch fabric 325 also distributes packets in the following order (F1, G2) and (G1, H2) on channels 3 and 4, respectively, to NxN shared-memory switch fabric 301.

At operation 415, NxN shared-memory switch fabrics 301 and 305 store the distributed packets in shared buffer memories 302 and 306, respectively. For example, NxN shared-memory switch fabric 301 stores packets A1, D2, D1, and B2 for ingress crossbar switch fabric 310 in shared buffer memory 302. NxN shared-memory switch fabric 301 also stores packets E1, E2, H1, and F2 in shared buffer memory 302 for ingress crossbar switch fabric 325.

Furthermore, NxN shared-memory switch fabric 305 stores packets C1, A2, B1, and C2 in shared buffer memory 306 for ingress crossbar switch fabric 310. NxN shared-memory switch fabric 305 also stores packets E1, E2, H1, and F2 in shared buffer memory 306 for ingress crossbar switch fabric 325.

At operation 420, NxN shared-memory switch fabrics 301 and 305 send a buffer number for each packet stored for ingress crossbar switch fabrics 310 and 325 indicating where each packet is stored in shared buffer memories 302 and 306. For example, NxN shared-memory switch fabric 301 may send packet buffer numbers for packets D1, B2, A1, and D2 to ingress port controllers informing ingress port controllers that distributed packets are stored in location 1 through 4, respectively, in shared buffer memory 302 by NxN shared-memory switch fabric 301. NxN shared-memory switch fabric 301 may also send buffer numbers for packets F1, G2, G1, and H2 to ingress crossbar switch fabric 325 informing ingress crossbar switch 325 that the packets are stored in location 5 through 8, respectively, in shared buffer memory 302 by NxN shared-memory switch fabric 301.

Furthermore, NxN shared-memory switch fabric 305 may send buffer numbers for packets C1, A2, B1, and C2 to ingress crossbar switch fabric 310 informing ingress crossbar switch 310 that the packets are stored in location 1 through 4, respectively, in shared buffer memory 306 by NxN shared-memory switch fabric 305. NxN shared-memory switch fabric 305 may also send buffer numbers for packets E1, E2, H1, and F2 to ingress crossbar switch fabric 325 informing ingress crossbar switch 325 that distributed packets are stored in location 5 through 8, respectively, in shared buffer memory 306 by NxN shared-memory switch fabric 305.

At operation 430, after receiving buffer numbers and switch instances, ingress port controllers which forwarded packets to ingress crossbar switch fabrics 310 and 325 generate and send forwarding information on notify ring 307 to egress port controllers. The forwarding information includes, for example, port information 292, packet switch instance 290, and packet buffer number 280 as illustrated in FIG. 9. Egress port controllers use the forwarding information to request packets from the appropriate shared-memory switch fabric. For example, regarding packet A1, an ingress port controller will generate forwarding information that would include port information that packet A1 is destined for egress port controller 315, buffer number information indicating that packet A1 is stored in shared buffer memory 302 at location 3, and switch instance information indicating that packet A1 is to be requested from NxN shared-memory switch fabric 301. An egress port controller will use the forwarding information to request packet A.

Egress Path

Retrieval and Re-Collection

FIG. 11 is a flow diagram of an operation 450 for retrieving and re-collecting packets on an egress path. For purposes of explanation, process 450 refers to network switch 300 as shown in FIG. 8. The nxm crossbar switch fabrics 315 and 320 are egress crossbar switch fabrics, respectively, that are responsible for recollecting packets from NxN shared-memory switch fabrics 301 and 305. The following process assumes no retrieval contention problems and distributed packets are re-collected in the order packets were received on ingress ports and by ingress crossbar switch fabrics.

At operation 460, egress port controllers request packets through egress crossbar switch fabrics 315 and 320 from NxN shared-memory switch fabrics 301 and 305 in the order the packets were received by ingress ports and by the ingress crossbar switch fabrics. For example, egress port controller for egress crossbar switch fabric 315 will request packets (A1, A2), (B1, B2), (C1, C2), and (D1, D2) in that order from NxN shared-memory switch fabrics 301 and 305. As shown in FIG. 8, packets received by ingress crossbar switch fabric 310 were distributed among multiple NxN shared-memory switch fabrics. In addition, egress port controller for egress crossbar switch fabric 320 will request packets (E1, E2), (F1, F2), (G1, G2), and (H1, H2) in that order from NxN shared-memory switch fabrics 301 and 305.

At operation 465, NxN shared memory switch fabrics 301 and 305 will receive requested packets from shared buffer memories 302 and 306, respectively. For example, NxN shared-memory switch fabric 301 will retrieve packets D1, B2, A1, and D2 from shared buffer memory 302 for egress crossbar switch fabric 315 in the order requested and packets F1, G2, G1, and H2 from shared buffer memory 302 for egress crossbar switch fabric 320 in the order requested. Also, NxN shared switch fabric 305 will retrieve packets C1, A2, B1, and C2 from shared buffer memory 306 for egress crossbar switch fabric 315 in the order requested and packets E1, E2, H1, and F2 from shared buffer memory 306 for egress crossbar switch fabric 320 in the order requested.

At operations 470 and 475, egress port controllers for egress crossbar switch fabrics 315 and 320 re-collect and transmit retrieved packets on egress ports in the order the packets were received by ingress crossbar switch fabrics 310 and 325. For example, egress crossbar switch fabric 315 re-collects packets (A1, A2), (B1, B2), (C1, C2), and (D1, D2) from NxN shared-memory switch fabrics 301 and 305 and transmits the packets in that order, which is the order the packets were received by ingress crossbar switch fabrics 310.

Egress Path

Retrieval and Re-Collection/Re-Ordering

FIG. 12 is a flow diagram of an alternative operation 480 for retrieving and re-collecting packets on an egress path using a re-ordering technique. For purposes of explanation, operation 480 refers to network switch 300 as shown in FIG. 8. The nxm crossbar switch fabrics 315 and 320 are egress crossbar switch fabrics, respectively, that are responsible for re-collecting packets from NxN shared-memory switch fabrics 301 and 305. The following process assumes there may be retrieval contention problems such that distributed packets may be recollected out of order based on availability of channels for re-collecting packets.

At operation 485, egress port controllers for egress crossbar switch fabrics 315 and 320 request packets from NxN shared-memory switch fabrics 301 and 305 based on an availability of a channel regardless of the packet order received by the ingress crossbar switch fabrics 310 and 325. For example, as shown in FIG. 8, egress port controller for egress crossbar switch fabric 315 requests packets (A2, B1), (C1, C2), (D1, B2), and (D2, A1) on channels 1 through 4, respectively, which is in an order different than the order the packets were received in by ingress crossbar switch fabric 310. Alternatively, for example, if channel 1 is unavailable, the egress port controller for the egress crossbar switch fabric 315 may obtain packets on channel 2 that are stored in shared buffer memory 306 associated with NxN shared-memory switch fabric 301.

Furthermore, the egress port controller for egress crossbar switch fabric 320 requests packets (E2, H1), (D1, F1), (G2, F1), and (H2, G1) on channels 1 through 4, respectively, which is in an order different than the order the packets were received in by ingress crossbar switch fabric 325. Alternatively, if channel 1 is unavailable, the egress port controller for egress crossbar switch fabric 320 may obtain packets on channel 4 that are stored in shared buffer memory 302 associated with NxN shared-memory switch fabric 301.

At operation 490, NxN shared-memory fabrics 301 and 305 receive requested packets from shared buffer memories 302 and 306 for egress crossbar switch fabrics 315 and 320. For example, NxN shared memory fabric 301 retrieves packets (D1, B2) and (A1, D2) from shared buffer memory 302 for egress crossbar switch fabric 315 and packets (F1, G2) and (G1, H2) from shared buffer memory 306 for egress crossbar switch fabric 320. NxN shared memory fabric 305 retrieves packets (E1, E2) and (H1, F2) from shared buffer memory 306 for egress crossbar switch fabric 320 and packets (C1, A2) and (B1, C2) from shared buffer memory 306 for egress crossbar switch fabric 315.

At operation 495, the egress port controllers use egress crossbar switch fabrics 315 and 320 to recollect packets based on the requested order and stores the requested packets in an egress buffer of an egress port controller, e.g., egress buffer 148 of FIG. 3, in which packets may be re-ordered and then transmitted on the egress ports in the order the packets were received on the ingress ports. For example, the egress port controller for egress crossbar switch fabric 315 receives packets (D2, A1) on channel 4 and the egress port controller may use sequence numbers to recorder the packets such that packet D2 will be transmitted on network port 4 in the order received and packet A1 will be transmitted on network port 1 in the order received. Egress port controller receiving packets from egress crossbar switch fabric 315 will perform the same process for all the requested packets.

In addition, the egress port controller for egress crossbar switch fabric 320 receives packets (H2, G1) on channel 4 from egress crossbar switch fabric 320 and may use sequence numbers to re-order the packets such that packet G1 will be transmitted on network port 3 in the order received and packet H2 will be transmitted on network port 1 in the order received. Egress port controller for egress crossbar switch fabric 315 will perform the same process for all the requested packets.

At operation 500, egress port controllers for egress crossbar switch fabrics 315 and 320 transmit packets in egress buffers to egress ports in the order the packets were received by ingress crossbar switch fabrics 315 and 320. For example, although the egress port controller for egress crossbar switch fabric 315 received packets on channels 1 through 4 in the following order (A2, B1), (C1, C2), (D1, B2), and (D2, A1), an egress port controller for egress crossbar switch fabric 315 transmits the packets on ports 1 through 4 in the following order (A1, A2), (B1, B2), (C1, C2), and (D1, D2), which is the order the packets were received by ingress crossbar switch fabric 310.

Furthermore, although the egress port controller for the egress crossbar switch fabric 320 received packets on channels 1 through 4 in the following order (E2, H1), (E1, F2), (G2, F1), and (H2, G1), the egress port controller for egress crossbar switch fabric 320 transmits the packets on ports 1 through 4 in the following order (E1, E2), (F1, F2), (G1, G2), and (H1, H2), which is the order the packets were received by ingress crossbar switch fabric 325.

For the process, the re-ordering of packets is transparent to network switch 300, and packets can be received on channels that are available. Furthermore, any dead time, or bubbles, on channels having no activity is also transparent to network switch 300 thereby allowing for increased performance.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

What is claimed is:

1. A network switch having a hybrid switch architecture, comprising:
    at least two shared-memory switch fabrics, each shared-memory switch fabric being configured to store and retrieve packets;
    at least two crossbar switch fabrics, each crossbar switch fabric being coupled to each of the shared-memory switch fabrics and configured to distribute and re-collect packets to and from each of the shared-memory switch fabrics;
    a port controller coupled to each of the crossbar switch fabrics and configured to retrieve packets from at least one network port and to forward packets to the crossbar switch fabrics and configured to receive packets from the crossbar switch fabrics and to forward packets to a destination network component via the at least one network port; and
    a notify ring coupled to each port controller, the notify ring configured to transfer forwarding information to each port controller, and wherein the forwarding information is used to request packets from the shared-memory switch fabrics by one of the port controllers;
    wherein each shared-memory switch fabric is also configured to send a packet buffer number indicating where a packet is stored in a shared buffer memory, packets are requested from each of the shared-memory switch fabrics based on an availability of a channel, and wherein the port controller is configured to request packets in an order different from an order the packets were received by the crossbar switch fabrics.

2. The network switch of claim 1, wherein each port controller is also configured to generate the forwarding information based on the packet buffer number and a switch instance sent from each shared-memory switch fabric.

3. The network switch of claim 2, wherein each port controller is configured to request packets from each of the shared-memory switch fabrics using the forwarding information.

4. The network switch of claim 3, wherein each crossbar switch on an egress path re-collects the requested packets and transmits the packets on egress ports in the order the requested packets were received by the crossbar switch on an ingress path before distribution.

5. The network switch of claim 3, wherein re-collected packets are stored in egress buffers, and wherein the egress buffers are configured to re-order the re-collected packets.

6. The network switch of claim 5, wherein each port controller includes:
    an egress request queue storing requests to re-collect packets from the shared-memory switch fabrics, and wherein the requests are serviced based on an availability of a channel.

7. The network switch of claim 5, wherein each crossbar switch fabric further includes:
    an ingress switching unit configured to receive packets and forward the received packets to channels coupled with the shared-memory switch fabrics; and
    an egress switching unit configured to receive requested packets from the shared-memory switch fabrics and forward the requested packets to a port controller.

8. A method of using a network switch having a hybrid switch architecture, the method comprising:
    distributing packets received by an ingress crossbar switch fabric to at least two shared-memory switch fabrics, wherein packets are requested from each of the at least two shared-memory switch fabrics based on an availability of a channel, and wherein the packets may be requested in an order different from an order the packets were received by the ingress crossbar switch fabrics;
    storing the distributed packets from the ingress crossbar switch fabric in a shared buffer memory associated with each shared-memory switch fabric; and
    sending a packet buffer number and a switch instance for each packet stored by each shared-memory switch fabric to an ingress port controller, the packet buffer number including information indicating where the packet is stored in the shared buffer memory and the switch instance including information which shared-memory switch fabric stored the packet.

9. The method of claim 8, further comprising:
    removing header or control information from received packets before distribution.

10. The method of claim 9, further comprising:
    requesting packets from the shared-memory switch fabrics by an egress port controller based on an availability of a channel regardless of an order the packets were received by an ingress port controller; and
    re-collecting the requested packets by the egress port controller; and
    re-ordering the re-collected packets such that packets are to be transmitted to a destination network component in an order the packets were received by the ingress port controller.

11. The method of claim 8, wherein distributing packets distributes packets directly, randomly, in a round robin, or some other selective manner to the shared-memory switch fabrics.

12. The method of claim 8, further comprising:
    generating forwarding information using the packet buffer number and the switch instance; and
    sending the forwarding information to an egress port controller via a notify ring.

13. The method of claim 12, further comprising:
    requesting packets from the shared-memory switch fabrics by an egress port controller using the forwarding information from the ingress port controller; and
    re-collecting the requested packets from the shared-memory switch fabrics by the egress port controller.

14. The method of claim 13, further comprising:
retrieving the requested packets from the shared buffer memory by the shared-memory switch fabrics; and
transmitting the packets to a destination network component in an order the packets were received by the ingress port controller.

15. A method of using a network switch having a hybrid switch architecture, the method comprising:
removing header or control information from packets received by an ingress crossbar switch fabric before distribution;
distributing received packets to at least two shared-memory switch fabrics;
storing the distributed packets from the ingress crossbar switch fabric in a shared buffer memory associated with each shared-memory switch fabric;
requesting packets from the shared-memory switch fabrics by an egress port controller based on an availability of a channel regardless of an order the packets were received by an ingress port controller;
re-collecting the requested packets by the egress port controller; and
re-ordering the re-collected packets such that packets are to be transmitted to a destination network component in an order the packets were received by the ingress port controller;
sending a packet buffer number and a switch instance for each packet stored by each shared-memory switch fabric to an ingress port controller, the packet buffer number including information indicating where the packet is stored in the shared buffer memory and the switch instance including information which shared-memory switch fabric stored the packet.

16. The method of claim 15, wherein distributing packets distributes packets directly, randomly, in a round robin, or some other selective manner to the shared-memory switch factors.

17. The method of claim 15, further comprising:
generating forwarding information using the packet buffer number and the switch instance; and
sending the forwarding information to an egress port controller via a notify ring.

18. The method of claim 17, further comprising:
requesting packets from the shared-memory switch fabrics by an egress port controller using the forwarding information from the ingress port controller; and
re-collecting the requested packets from the shared-memory switch fabrics by the egress port controller.

19. The method of claim 18, further comprising:
retrieving the requested packets from the shared buffer memory by the shared-memory switch fabrics; and
transmitting the packets to a destination network component in an order the packets were received by the ingress port controller.

20. A network switch having a hybrid switch architecture, comprising:
at least two first switch means, each first switch means for storing and retrieving packets; and
at least two second switch means, each second switch means coupled to one of the first switch means such that each second switch means is coupled to every first switch means, each second switch means for receiving packets from any one of a plurality of ports included in the second switch means and distributing the received packets to any one of the first switch means, and re-collecting packets from any one of the first switch means and transmitting the re-collected packets to any one of the plurality of ports
wherein each of the first switch means is also configured to send a packet buffer number indicating where a packet is stored in a shared buffer memory, packets are requested from each of the first switch means based on an availability of a channel,
wherein packets are requested from each of the first switch means based on an availability of a channel, and wherein the packets may be requested in an order different from an order the packets were received by the second switch means.

21. The network switch of claim 20, wherein each first switch means includes N inputs for receiving packets and N outputs for sending packets on N channels.

22. The network switch of claim 20, further comprising:
controller means coupled to each of the second switch means for retrieving packets from at least one network port and forwarding packets to the plurality of ports of the second switch means, and
for receiving packets from the plurality of ports of the second switch means and forwarding packets to a destination network component via the at least one network port.

23. The network switch of claim 22, further comprising:
notify means coupled to each controller means for transferring forwarding information to each controller means, wherein the forwarding information is used to request packets from the first switch means by one of the controller means.

24. The network switch of claim 23, wherein each controller means is further for generating the forwarding information based on the packet buffer number and a switch instance sent from each first switch means.

25. The network switch of claim 24, wherein each controller means is further for requesting packets from each of the first switch means using the forwarding information.

26. The network switch of claim 22, wherein each crossbar switch fabric is configured to distribute packets from one of the plurality of ports of the crossbar switch fabrics to more than one of the first switch means without reference to the final port destination of the packets.

27. The network switch of claim 26, wherein each first switch means is further for storing and retrieving the distributed packets from the second switch means in a shared buffer memory.

28. A network switch having a hybrid switch architecture, comprising:
means for distributing packets received by an ingress crossbar switch fabric to at least two shared-memory switch fabrics, wherein packets are requested from each of the at least two shared-memory switch fabrics based on an availability of a channel, and wherein the packets may be requested in an order different from an order the packets were received by the ingress crossbar switch fabrics;
means for storing the distributed packets from the ingress crossbar switch fabric in a shared buffer memory associated with each shared-memory switch fabric; and
means for sending a packet buffer number and a switch instance for each packet stored by each shared-memory switch fabric to an ingress port controller, the packet buffer number including information indicating where the packet is stored in the shared buffer memory and the switch instance including information which shared-memory switch fabric stored the packet.

29. The network switch of claim 28, further comprising:
means for removing header or control information from received packets before distribution.

30. The network switch of claim 29, further comprising:
means for requesting packets from the shared-memory switch fabrics by an egress port controller based on an availability of a channel regardless of an order the packets were received by an ingress port controller; and
means for re-collecting the requested packets by the egress port controller; and
means for re-ordering the re-collected packets such that packets are to be transmitted to a destination network component in an order the packets were received by the ingress port controller.

31. The network switch of claim 28, further comprising:
means for generating forwarding information using the packet buffer number and the switch instance; and
means for sending the forwarding information to an egress port controller via a notify ring.

32. The network switch of claim 31, further comprising:
means for requesting packets from the shared-memory switch fabrics by an egress port controller using the forwarding information from the ingress port controller; and
means for re-collecting the requested packets from the shared-memory switch fabrics by the egress port controller.

33. The network switch of claim 32, further comprising:
means for retrieving the requested packets from the shared buffer memory by the shared-memory switch fabric; and
means for transmitting the packets to a destination network component in an order the packets were received by the ingress port controller.

34. A network switch having a hybrid switch architecture, comprising:
means for removing header or control information from packets received by an ingress crossbar switch fabric before distribution;
means for distributing received packets to at least two shared-memory switch fabrics, each of the at least two shared-memory switch fabrics to store and retrieve packets;
means for storing the distributed packets from the ingress crossbar switch fabric in a shared buffer memory associated with each shared-memory switch fabric, the ingress crossbar switch fabric coupled to the at least two shared-memory switch fabrics;
means for transferring forwarding information to an ingress port controller;
means for requesting packets from the shared-memory switch fabrics by an egress port controller based on an availability of a channel regardless of an order the packets were received by the ingress port controller;
means for retrieving packets from a network port, to forward packets to the crossbar switch fabric and to receive packets from the crossbar switch fabrics and to forward packets to a destination network component via the at least one network port;
means for re-collecting the requested packets by the egress port controller; and
means for re-ordering the re-collected packets such that packets are to be transmitted to a destination network component in an order the packets were received by the ingress port controller,
wherein each shared-memory switch fabric is further to send a packet buffer number indicating where a packet is stored in a shared buffer memory, packets are requested from each of the shared-memory switch fabrics based on an availability of a channel, and wherein the packets may be requested in an order different from an order the packets were received by the crossbar switch fabrics.

35. The network switch of claim 34, further comprising:
means for sending a packet buffer number and a switch instance for each packet stored by each shared-memory switch fabric to an ingress port controller, the packet buffer number including information indicating where the packet is stored in the shared buffer memory and the switch instance including information which shared-memory switch fabric stored the packet.

36. The network switch of claim 35, further comprising:
means for generating forwarding information using the packet buffer number and the switch instance; and
means for sending the forwarding information to an egress port controller via a notify ring.

37. The network switch of claim 36, further comprising:
means for requesting packets from the shared-memory switch fabrics by an egress port controller using the forwarding information from the ingress port controller; and
means for re-collecting the requested packets from the shared-memory switch fabrics by the egress port controller.

38. The network switch of claim 37, further comprising:
means for retrieving the requested packets from the shared buffer memory by the shared-memory switch fabrics; and
means for transmitting the packets to a destination network component in an order the packets were received by the ingress port controller.

* * * * *